(12) United States Patent
Kim et al.

(10) Patent No.: US 10,432,360 B2
(45) Date of Patent: Oct. 1, 2019

(54) METHOD AND DEVICE FOR PERFORMING HARQ BASED ON POLAR CODES

(71) Applicant: LG ELECTRONICS INC., Seoul (KR)

(72) Inventors: Il-Min Kim, Seoul (KR); Joonkui Ahn, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 15/843,562

(22) Filed: Dec. 15, 2017

(65) Prior Publication Data

US 2018/0175976 A1    Jun. 21, 2018

Related U.S. Application Data

(60) Provisional application No. 62/435,847, filed on Dec. 19, 2016.

(51) Int. Cl.

| | |
|---|---|
| *H04L 1/18* | (2006.01) |
| *H04L 1/00* | (2006.01) |
| *H03M 13/13* | (2006.01) |
| *H04L 9/08* | (2006.01) |
| *H03M 13/00* | (2006.01) |

(52) U.S. Cl.
CPC .......... *H04L 1/1819* (2013.01); *H03M 13/13* (2013.01); *H03M 13/6306* (2013.01); *H04L 1/0057* (2013.01); *H04L 1/0067* (2013.01); *H04L 1/0071* (2013.01); *H04L 9/0852* (2013.01)

(58) Field of Classification Search
CPC ... H04L 1/0055; H04L 1/0061; H04L 1/0071; H04L 1/1812; H04L 1/1819; H04L 1/1861; H03M 13/13; H03M 13/6306
See application file for complete search history.

(56) References Cited

U.S. PATENT DOCUMENTS

2013/0019137 A1* 1/2013 Wu .................. H04L 1/1812
                                                            714/751
2019/0052418 A1* 2/2019 Li ..................... H04L 1/1819

* cited by examiner

*Primary Examiner* — Shelly A Chase
(74) *Attorney, Agent, or Firm* — Birch, Stewart, Kolasch & Birch, LLP

(57) ABSTRACT

Disclosed herein is method and device for performing a Hybrid Automatic Repeat request (HARQ) based on polar codes in a wireless communication system. A transmitter transmits a first packet to a receiver. The transmitter receives a re-transmission request for the first packet from the receiver. The transmitter transmits a second packet to the receiver. Herein, each of the first packet and the second packet includes at least one information bit and at least one frozen bit. An information bit having a smallest mutual information corresponding to a bit channel within the first packet is re-transmitted through a first bit channel capable of transmitting at least one information bit included in the second packet. Alternatively, a new information bit is transmitted through a second bit channel capable of transmitting at least one information bit included in the second packet.

14 Claims, 45 Drawing Sheets

N=8

N=8

N=16

No REP; Rate$_1$ =14/32; FER$_1$

1 REP; Rate$_2$ =13/32; FER$_2$

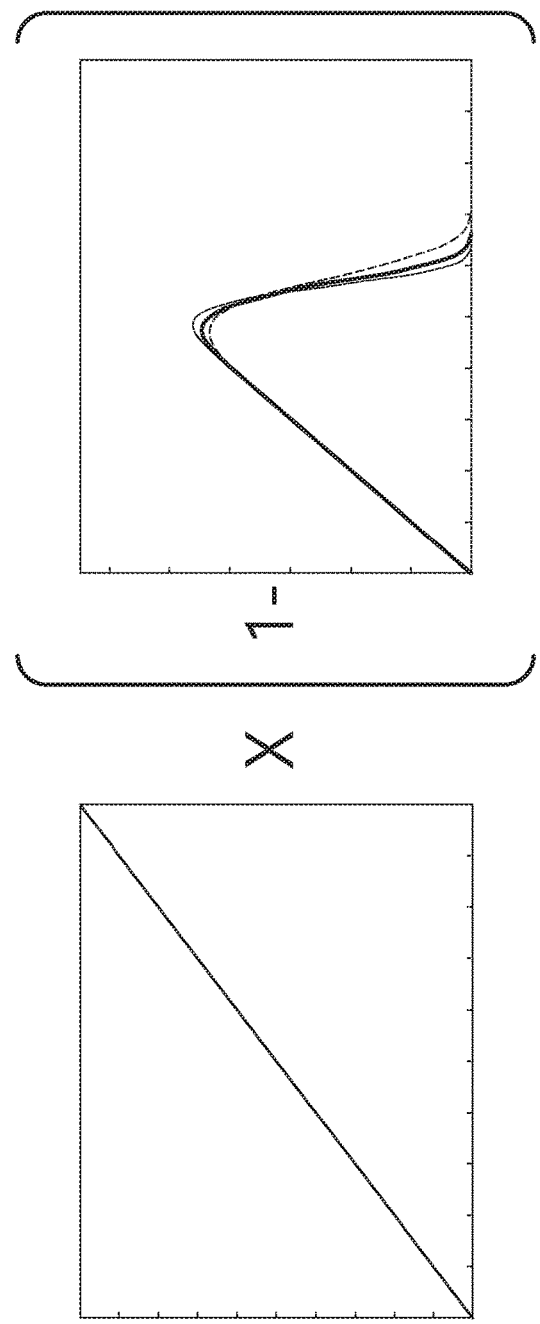

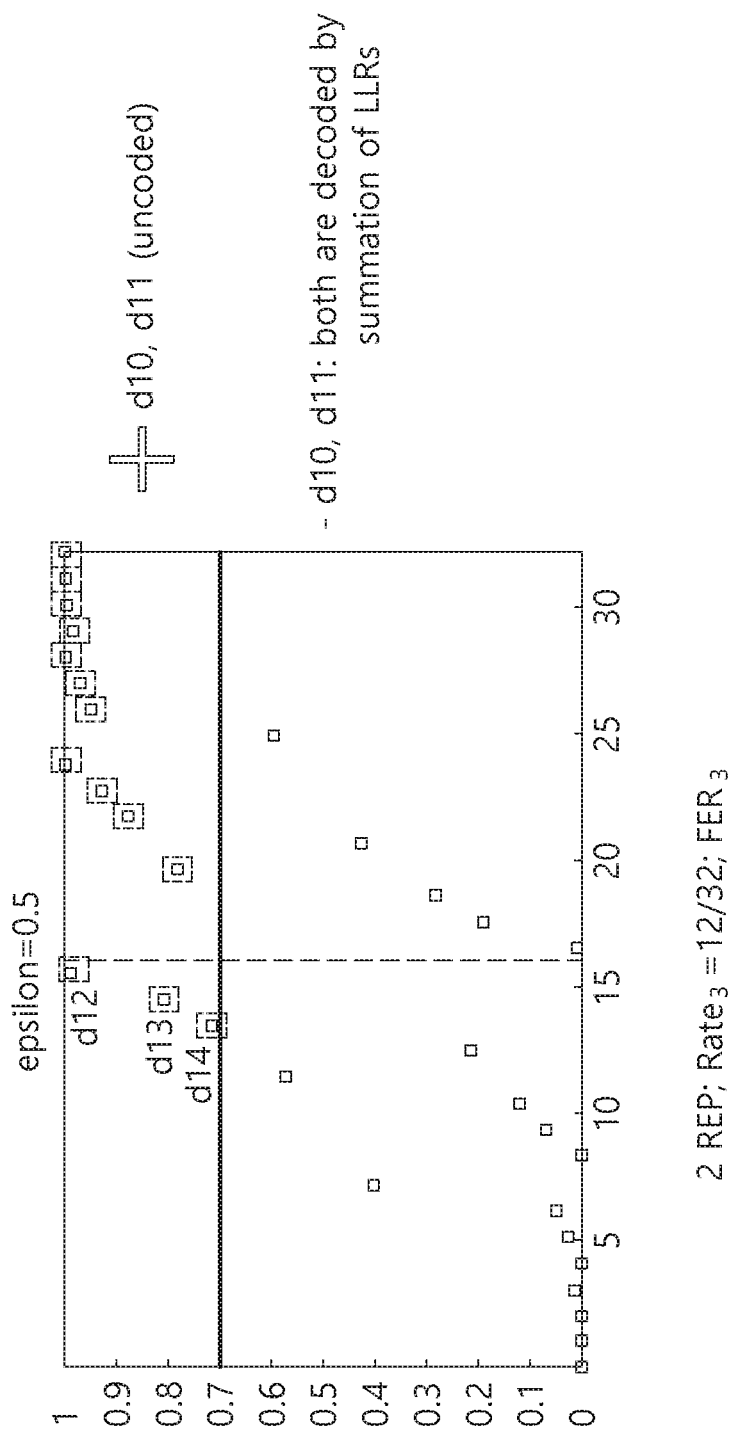

Information bits are always secure for all sub packets

The total secrecy throughput is $I^{(1)} + I^{(2)} + I^{(3)}$

———— : desired user
- - - - - : other user 1
— — — : other user 2

I: data
M: encrypted data
R: random bits
Z: zeros

The total secrecy throughput is $I^{(1)} + I^{(2)} + I^{(3)} + I^{(4)}$

———— : desired user    I: data
------ : other user 1   M: encrypted data
——— : other user 2   R: random bits
——— : other user 3   Z: zeros ——— : desired user  　I: data
------- : other user 1  　M: encrypted data
——— : other user 2  　R: random bits
——— : other user 3  　Z: zeros — : desired user      I: data
----- : other user 1    M: encrypted data
— — : other user 2    R: random bits
                      Z: zeros — : desired user    I: data
---- : other user 1    M: encrypted data
— — : other user 2    R: random bits
                           Z: zeros

METHOD AND DEVICE FOR PERFORMING HARQ BASED ON POLAR CODES

CROSS-REFERENCE TO RELATED APPLICATION

Pursuant to 35 U.S.C. § 119(e), this application claims the benefit of U.S. Provisional Application No. 62/435,847, filed on 19 Dec. 2016, the contents of which are all hereby incorporated by reference herein in their entirety.

TECHNICAL FIELD

The present invention relates to wireless communication and, most particularly, to a method and device for performing a Hybrid Automatic Repeat request (HARQ) based on polar codes.

BACKGROUND

In a data communication system, it is important to deliver data from a transmitter to a receiver without any error. In 1948, Shannon mathematically defined a limit of a maximum data transmission rate that can be delivered without error. This is referred to a channel capacity. In order to implement an actual communication system having a data transmission rate most approximate to such channel capacity, an error correction code having a complexity that can be implemented is required. Since 1948, various types of error correction codes have been developed. Among the recently developed error correction codes, the turbo code and Low Density Parity Check (LDPC) have been known to perform with a channel capacity that is relatively most approximate to Shannon's channel capacity. However, although such codes demonstrate performance that is most approximate to Shannon's channel capacity, they do not achieve the accurate channel capacity. Recently, in the process of resolving the above-described problems, the polar code, which fully satisfies and achieves the channel capacity mathematically, has been developed.

The Hybrid Automatic Repeat request (HARQ) corresponds to an error recovery technique, which is performed by requesting re-transmission of a packet, when a packet having an error is received. Diverse development has also been carried out on HARQ methods based on polar codes (or polar coding). However, according to the methods that have been proposed up to this day, such methods have not been developed as a means of enhancing channel polarization of information, which corresponds to a basic concept of polar coding.

SUMMARY OF THE INVENTION

Technical Object

An object of this specification is to provide a method and device for performing HARQ based on polar codes in a wireless communication system.

Technical Solution

According to an aspect of this specification, proposed herein is a method and device for performing a Hybrid Automatic Repeat request (HARQ) based on polar codes.

The device includes a radio frequency (RF) unit transmitting and receiving radio signals, and a processor being operatively connected to the RF unit.

A transmitter transmits a first packet to a receiver. The transmitter receives a re-transmission request for the first packet from the receiver. The transmitter transmits a second packet to the receiver. At this point, the receiver may only receive the second packet or may receive a packet configured by combining the first packet and the second packet and may then perform decoding. Also, the second packet may correspond to a packet including the first packet.

At this point, the first packet includes at least one information bit and at least one frozen bit, and the second packet includes at least one information bit and at least one frozen bit. The at least one information bit corresponds to a bit having a mutual information corresponding to a bit channel greater than or equal to a pre-defined threshold value, and the at least one frozen bit corresponds to a bit having a mutual information corresponding to a bit channel less than a pre-defined threshold value.

An information bit having a smallest mutual information corresponding to a bit channel within the first packet is re-transmitted through a first bit channel capable of transmitting at least one information bit included in the second packet. More specifically, among the bit channels that are added by using the second packet, a specific bit channel is used for performing repetition (REP) coding, thereby being capable of re-transmitting information bits, which were transmitted to a bit channel having the smallest mutual information within the first packet.

Alternatively, a new information bit is transmitted through a second bit channel capable of transmitting at least one information bit included in the second packet. More specifically, among the bit channels that are added by using the second packet, new information bits may be transmitted by using a bit channel having the best channel condition.

The HARQ combination method corresponds to an operation combining the two above-described method, wherein a number of new information bits (=a number of second bit channels) and a number of REP-coded information bits (=a number of first bit channels) that are to be transmitted through the bit channels being added by the second packet may be determined.

The number of first bit channels and the number of second bit channels may be determined so as to allow a throughput of the second packet to have a maximum value. At this point, the throughput of the second packet may be determined based on a code rate of the second packet and a frame decoding error and a channel Signal to Noise Ratio (SNR) of the second packet.

A code rate of the second packet corresponding to a case where a number of first bit channels is greater than a number of second bit channels may be lower than a code rate of the second packet corresponding to a case where a number first bit channels is less than a number of second bit channels.

However, a frame decoding error of the second packet corresponding to a case where a number of first bit channels is greater than a number of second bit channels may be smaller than a frame decoding error of the second packet corresponding to a case where a number of first bit channels is less than a number of second bit channels.

More specifically, when a larger number of REP-coded information bits than new information bits are transmitted through bit channels that are added by the second packet, since the frame decoding error of the second packet is low, this is advantageous in light of error likelihood. However, since the code rate of the second packet also becomes low, this is disadvantageous in light of the transmission rate. Accordingly, the number of first bit channels and the number of second bit channels may be determined so that the throughput of the second packet can have a maximum value.

Additionally, polar codes may be applied to information bits being transmitted through the first bit channels and the second bit channels.

As another example of the HARQ combination method, the transmitter may transmit additional information bits along with the second packet to the receiver. At least one information bit being included in the first packet may be re-transmitted through a third bit channel, which may transmit the additional information bits. At this point, polar coding is not applied (or polar codes are not applied) to the additional information bits.

In order to allow the receiver to perform REP decoding and polar decoding at the same time, the receiver is required to perform list decoding, which requires a number of branches proportional to an ascending power of the number of decoded bits. However, list decoding is disadvantageous in that it increases decoding complexity. Therefore, by having the transmitter transmit additional information bits that are REP-coded but not polar coded, the receiver may measure the LLR values of the additional information bits and may immediately perform decoding without having to perform list decoding. Thus, the problem of decoding complexity does not occur.

BRIEF DESCRIPTION OF THE DRAWINGS

FIG. 8A and FIG. 8B show a method of obtaining a throughput from the code rate and the FER of polar coding HARQ combination method 1.

FIG. 10A, FIG. 10B and FIG. 10C show an example of polar coding HARQ combination method 2.

DESCRIPTION OF EXEMPLARY EMBODIMENTS

Figure 1A:
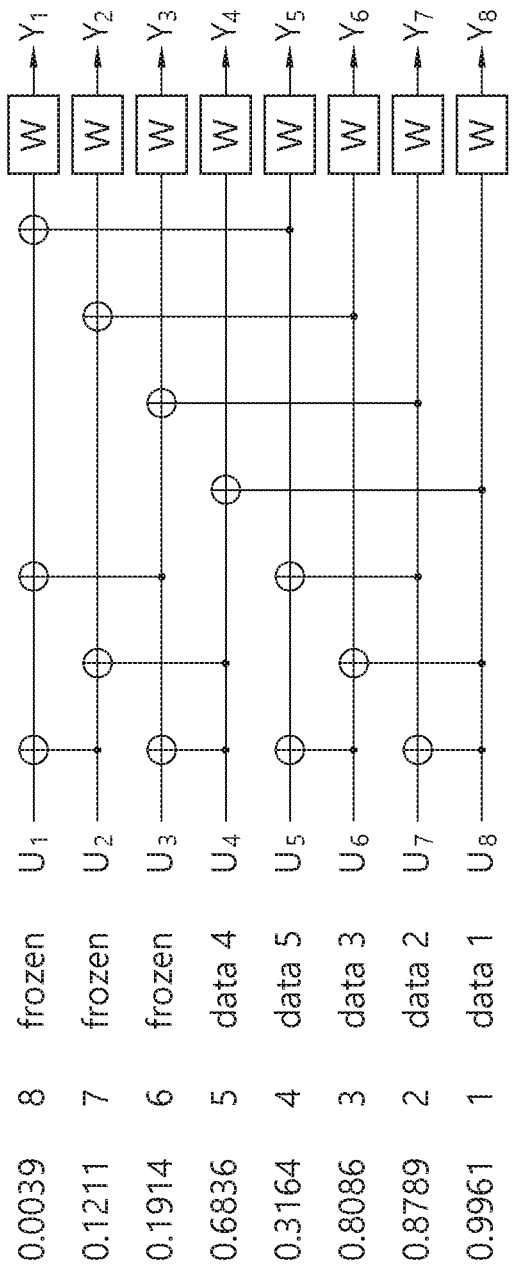
FIG. 1A, FIG. 1B and FIG. 1C show an example of polar coding HARQ method 1 for two contiguous packets.

One of the most essential objects of digital communication is to transmit information, which is configured of digital bits, from a transmitting end to a receiving end as quickly as possible without any error. Two of the most representative methods for performing such transmission of information without any error are Automatic Repeat Request (ARQ) and error correction coding. Firstly, the ARQ method (or scheme) operates as described below. When an information packet is initially transmitted from a transmitting end, the information packet is transmitted while including a cyclic redundancy check (CRC). A receiving end verifies whether an error exists or does not exist in the received packet through by using the CRC. Then, the receiving end notifies the verified result to the transmitting end through a feedback channel. When the transmitting end is informed that a previously transmitted packet has been received by the receiving end without any error, the transmitting end transmits a new next packet. Conversely, when an error occurs in the received packet in the receiving end, the transmitting end re-transmits the packet in which the error has occurred.

One of the most representative methods for overcoming the errors occurring in a channel is to use an error correction code. An error correction code achieving a channel capacity corresponding to a binary input/output channel has been developed very recently. And, such error correction code is referred to as a polar code. When using a polar code, channel polarization occurs. And, accordingly, only two types of bit channels exist. The bit channels belonging to a first group have excellent quality (i.e., error hardly occurs), and the bit channels belonging to a second group have very poor quality (i.e., error occurs almost all the time). In polar coding, information bits are transmitted through bit channels having excellent quality, and bits that are informed in advance to the transmitting end and/or the receiving end are transmitted through bit channels having poor quality. Such bits are also referred to as frozen bits. As described above, by identifying high quality (or excellent quality) bit channels and poor quality bit channels, and by allocating information bits only to positions within a bit channel having excellent quality is referred to as optimal information bit allocation.

A method combining the ARQ method and error correction coding is referred to as Hybrid Automatic Repeat request (HARQ). Different types of HARQ methods may exist depending upon the error correction code that is used. The HARQ method that is considered in the present invention corresponds to HARQ based on polar codes that combines polar coding and ARQ. In case of implementing the HARQ that is based on polar codes, first, a mother code having a low transmission rate is configured. Then, the corresponding code (i.e., the mother code) is punctured to be divided into a plurality of packets. Thereafter, the packets are transmitted one at a time.

This specification proposes a new method having a more enhanced performance as compared to the conventional HARQ method that is based on polar codes. Additionally, polar coding corresponds to a highly efficient method for implementing physical layer security, and polar coding that achieve physical layer security is referred to as secure polar coding. The legacy secure polar coding is optimized for cases when one eavesdropper exists. However, in an actual communication environment, a plurality of eavesdroppers may exist. In such case, if the legacy secure polar coding method is used without any further changes, the performance may not be good. In order to resolve such problems, this specification proposes an efficient secure polar coding method having excellent performance even in situations where multiple eavesdroppers exist.

Error correction coding refers to a process of correcting a bit error occurring in a channel by the receiving end without performing any re-transmission. Until now, a wide range of error correction codes have been developed. And, among such error correction codes, the polar code is the first error correction code that has been mathematically proven to achieve Shannon's channel capacity. According to recent studies, the performance of polar codes is known to be more excellent than the performance of turbo codes or LDPC codes, and so on, which have been known to have the best performance up until now.

Another method for correcting errors occurring in a channel is to use an automatic repeat request (ARQ). In this method, a cyclic redundancy check (CRC) is added to a data packet that is transmitted. And, then, the receiving end checks the CRC to determine (or verify) whether or not an error has occurred in the channel. If it is verified that an error has occurred in the channel, the receiving end requests to the transmitting end for a re-transmission of the data, and the transmitting end re-transmits the corresponding data.

A method combining the two above-described methods, i.e., the error correction coding method and the automatic repeat request (ARQ) method, corresponds to the hybrid automatic repeat request (HARQ) method. Diverse HARQ methods using diverse error correction codes are presented in this document. Most particularly, diverse HARQ methods using polar coding are proposed in this specification. FIG. 1 shows one of the methods that have already been proposed in the past. For simplicity, this method will hereinafter be referred to as "polar coding HARQ method 1" and even more briefly referred to as "method 1".

FIG. 1 shows an example of polar coding HARQ method 1 for two contiguous packets.

Referring to FIG. 1, $U_i$, which is indicated on the left side of the drawing, represents an input bit that is to be encoded later on, and W represents a channel. $Y_i$ represents a signal that is received by a receiving end. And, $C(W_i)$ represents mutual information of each bit channel. FIG. 1A shows a first packet (Frame 1). The first packet has a code length of 8 and transmits 5 information bits. Therefore, its code rate is equal to 5/8. The 5 information bits are respectively transmitted through 5 bit channels having the largest mutual information among the 8 bit channels. Then, frozen bits are transmitted through the remaining 3 bit channels. A frozen channel refers to bits that are known in advance by the transmitting end and the receiving end, and in case of a symmetric channel, bit zero (bit 0) is transmitted.

Figure 1B:
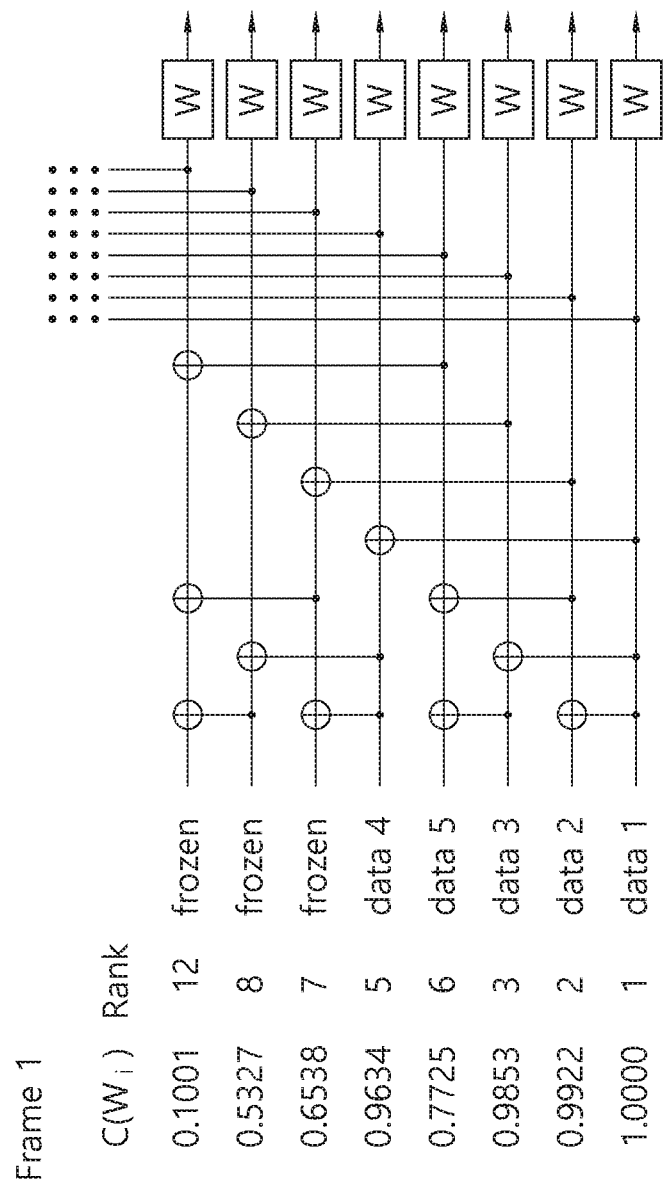
Figure 1C:
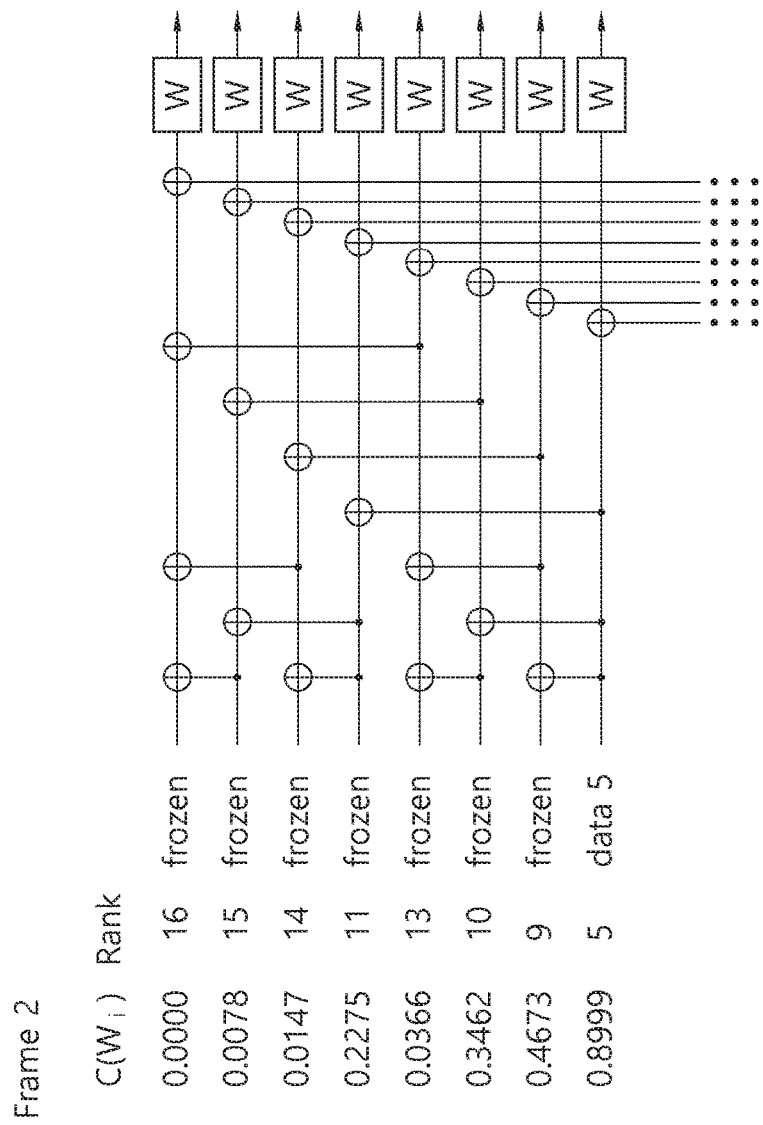

After the first packet is transmitted through a channel, if an error occurs when the receiving end decodes the received first packet, the transmitting end transmits a second packet (Frame 2). At this point, as shown in FIG. 1B and FIG. 1C, the second packet is combined with the first packet and becomes a polar code having a code length of 16. At this point, referring to the mutual information of the 8 bit channel of the second packet having an added code length of 8, the mutual information of the first bit channel starting from the bottom of the second packet (Frame 2) is equal to 0.8999, which corresponds to a fifth rank (Rank 5). In the first packet (Frame 1), this mutual information is equal to 0.7725, which corresponds to the fourth bit channel having the smallest mutual information, among the 5 bits channels through which information is transmitted, and which corresponds to a sixth rank (Rank 6). In polar coding HARQ method 1, in case the mutual information of all of the bit channels belonging to the second packet is larger than the smallest mutual information of a bit channel transmitting information in the first packet, data are transmitted through such bit channels of the second packet by using a repetition (REP) method. At this point, the data being transmitted through the REP coding method corresponds to bits being transmitted through the bit channel having the smallest mutual information in the first packet. Herein, transmission being performed by using the REP coding method refers to re-transmitting the same bit once again.

Figure 2A:
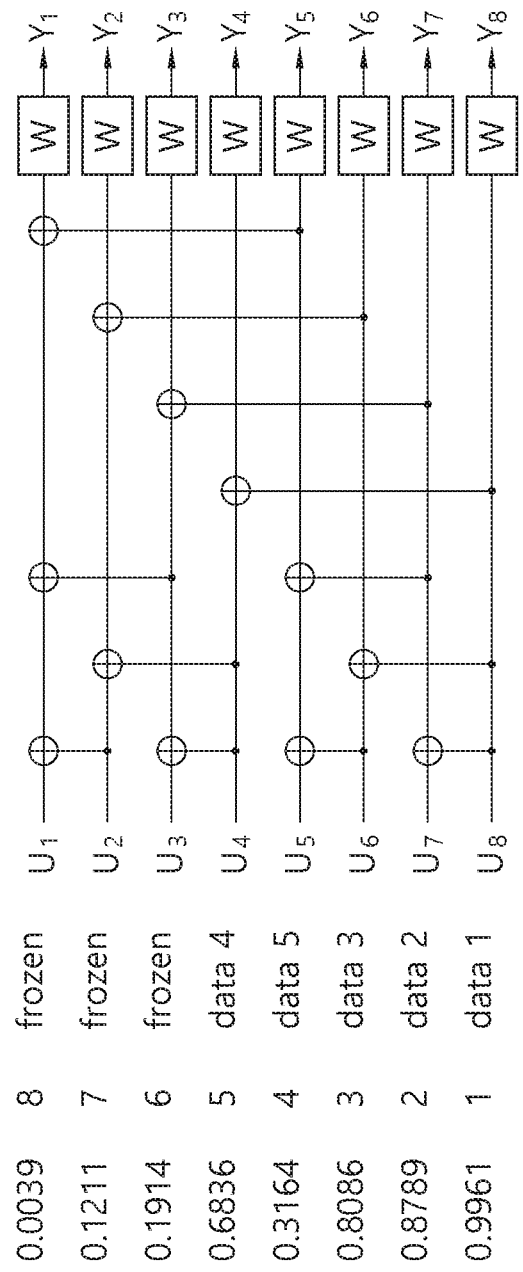
FIG. 2A, FIG. 2B and FIG. 2C show an example of polar coding HARQ method 2 for two contiguous packets.

FIG. 2 shows an example of polar coding HARQ method 2 for two contiguous packets.

Figure 2B:
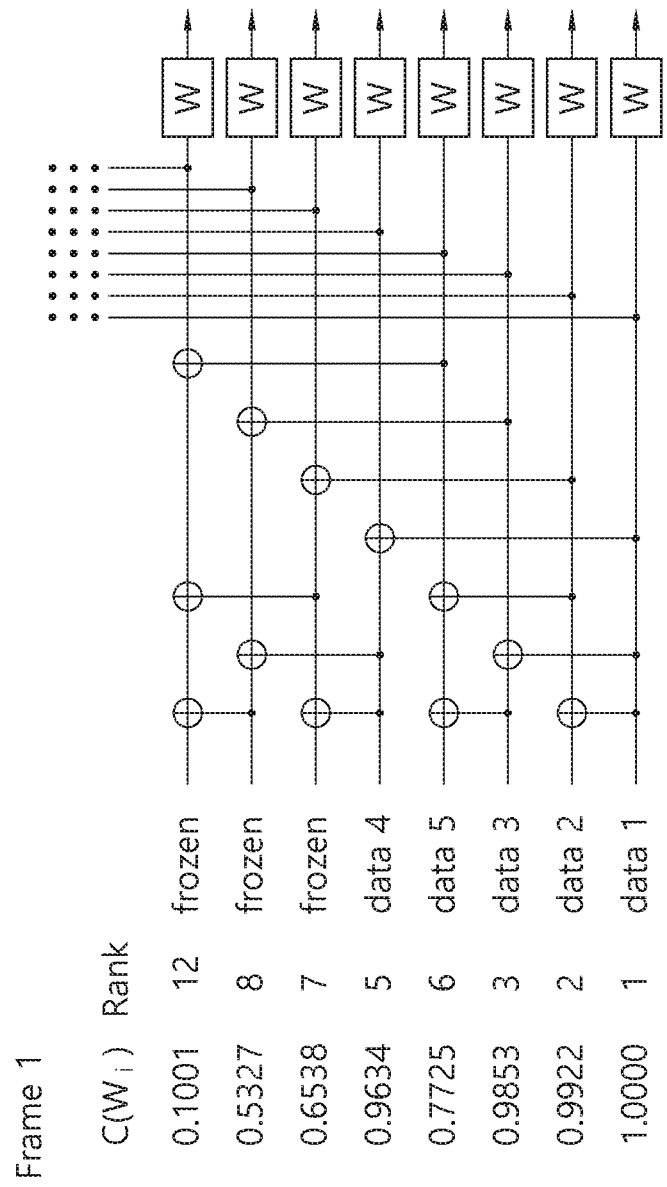
Figure 2C:
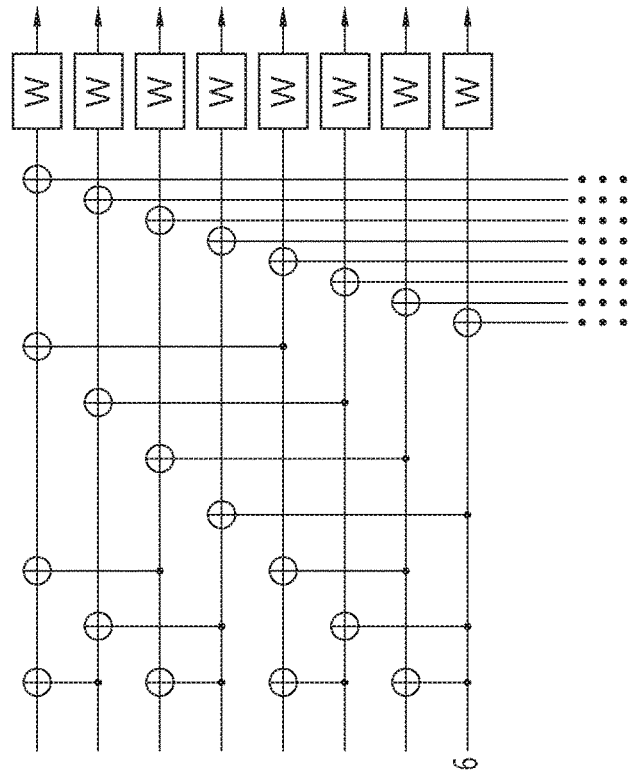

The method shown in FIG. 2 will hereinafter be referred to as "polar coding HARQ method 2" or as "method 2". This method is essentially similar to method 1 shown in FIG. 1. However, method 2 is different from method 1 in that it does not use the REP coding method. More specifically, in method 2, a completely new set of data is transmitted instead of using the REP coding method. As shown in FIG. 2B and FIG. 2C, method 2 transmits new bits (new data 6) through a first bit channel from the bottom of the second packet (Frame 2) (i.e., the bit channel having the mutual information of 0.8999).

In the above-described method 1 and method 2, only the transmission of two contiguous packets is described. However, in an actual environment, the HARQ method, which transmits packets several times should be used. Additionally, another problem is that it is not certain which of the two methods, i.e., method 1 and method 2, has a better performance. In order to resolve the above-described problems, this specification proposes a polar coding HARQ method that can extend method 1 and method 2 to allow packets to be transmitted several times and that can combine the two methods so as to have a more enhanced performance.

In the description presented above, the issue of delivering information to a receiving end without any error by using HARQ that is based on polar codes was discussed. In a communication system, in addition to the issue of transmitting data without any error, another highly important issue exists. This issue corresponds to an issue of communication security, which allows only one user to decode a specific set of data, when the corresponding data (i.e., desired data) are transmitted according to a request made by the corresponding user, and which prevents any other user from decoding the corresponding data. Up until now, the most widely used method for ensuring communication security is the method using cryptography. Although the communication security method that is based on cryptography has been used as the standard for communication security until recently, this method has several problems. Firstly, it is assumed that the calculation capability of an eavesdropper (hereinafter referred to as Eve) is limited in the cryptography-based communication security method. However, if the calculation capability of an eavesdropper becomes considerably high (e.g., when using a quantum computer), security can no longer be ensured in the legacy communication method using cryptography. Secondly, when performing communication security based on cryptography, it is imperative to generate, distribute, and manage security keys. In diverse future wireless environments, it may become difficult to configure such security key related processes, and such processes may cause a considerable duration of delay or may cause excessive complexity. In order to resolve the above-described problems, physical layer security that is based on information theory or communication theory is being considered. In the physical layer security, instead of using cryptography, secure communication and bit error correction are performed simultaneously in the physical layer. There are diverse methods of approach in the physical layer security. And, one of the most effective methods corresponds to using polar coding. Such polar coding method is referred to as secure polar coding.

Figure 3:
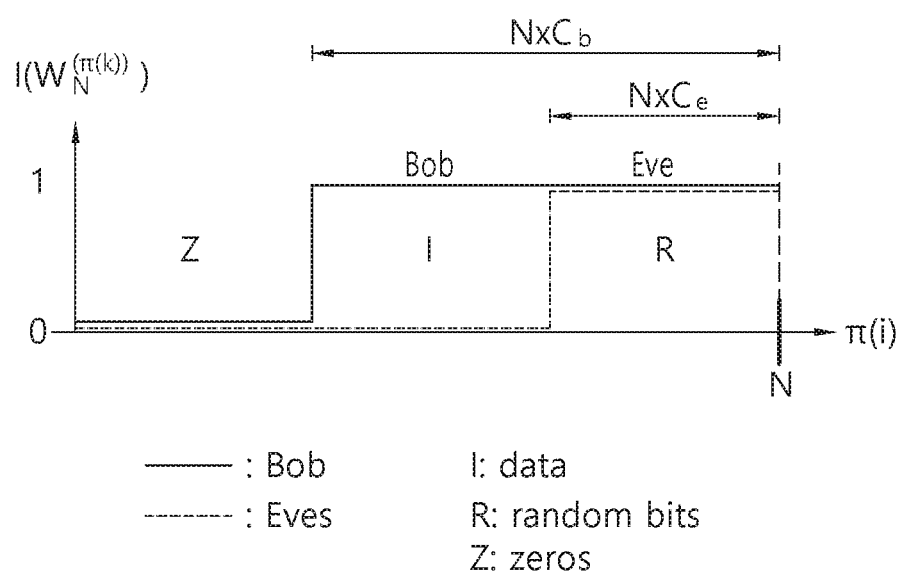
FIG. 3 shows an example of a legacy secure polar coding method, when one eavesdropper exists.

FIG. 3 shows an example of a legacy secure polar coding method, when one eavesdropper exists.

FIG. 3 illustrates a secure polar coding method corresponding to a case when one eavesdropper (also referred to as Eve) exists. Herein, N represents a length of a code, $C_b$ represents a channel capacity of a legitimate receiver (also referred to as Bob), and $C_e$ represents a channel capacity of an eavesdropper (or Eve). Also, $\pi(i)$ represents a bit channel index. More specifically, this represents a bit channel index corresponding to a case when bit channels are aligned so that the mutual information can be increased. As shown in FIG. 3, random bits are transmitted through $N*C_e$ number of bit channels having the largest mutual information, and information bits are transmitted through the next $N*(C_b-C_e)$ number of bit channels. Furthermore, frozen bits are transmitted through the remaining channel bits. Such codes are referred to as secure polar codes. And, when using such secure polar codes, an eavesdropper (i.e., Eve) may only be capable of decoding random bits that carry meaningless information, and actual meaningful information may be decoded only by a legitimate receiver (i.e., Bob).

The secure polar code may be used in case the transmitting end is correctly informed on the channel information of the legitimate receiver and the eavesdropper. However, if the transmitting end does not have such channel information, the secure polar code shown in FIG. 3 cannot be used. As described above, in case the channel information is not known to the transmitting end, an HARQ method that is based on secure polar coding should be used. This method is proposed in this specification.

Another limitation of the secure polar code shown in FIG. 3 is that only one eavesdropper exists within a receiving range of a signal. However, in an actual communication environment, a plurality of eavesdroppers may exist, and, in such case, it is an important issue to develop an effective secure polar coding method.

Therefore, this specification proposes a solution for resolving the problems of the above-described method 1, method 2, and the legacy secure polar coding method. And, the respective technical objects are as listed below.

Firstly, method 1 and method 2 are extended to be applied to the transmission of more than two packets.

Additionally, an optimal polar coding HARQ method having an optimal throughput is developed by combining only the advantages of method 1 and method 2. This method is referred to as combination method 1.

Also, another optimal polar coding HARQ method for reducing decoding complexity in the receiving end is developed. This method is referred to as combination method 2.

Also, in case the transmitting end is not correctly informed on the channel information, a method for configuring polar coding HARQ is proposed.

Also, a polar coding HARQ method configuring physical layer security is developed.

And, finally, a secure polar code for a case when multiple eavesdroppers exist is proposed.

1. HARQ Using Polar Coding 1.1 Extending Method 1 and Method 2 for Transmitting Two or More Packets and List Decoding FIG. 4 shows an example of polar coding HARQ method 1 for two or more packets.

Figure 4A:
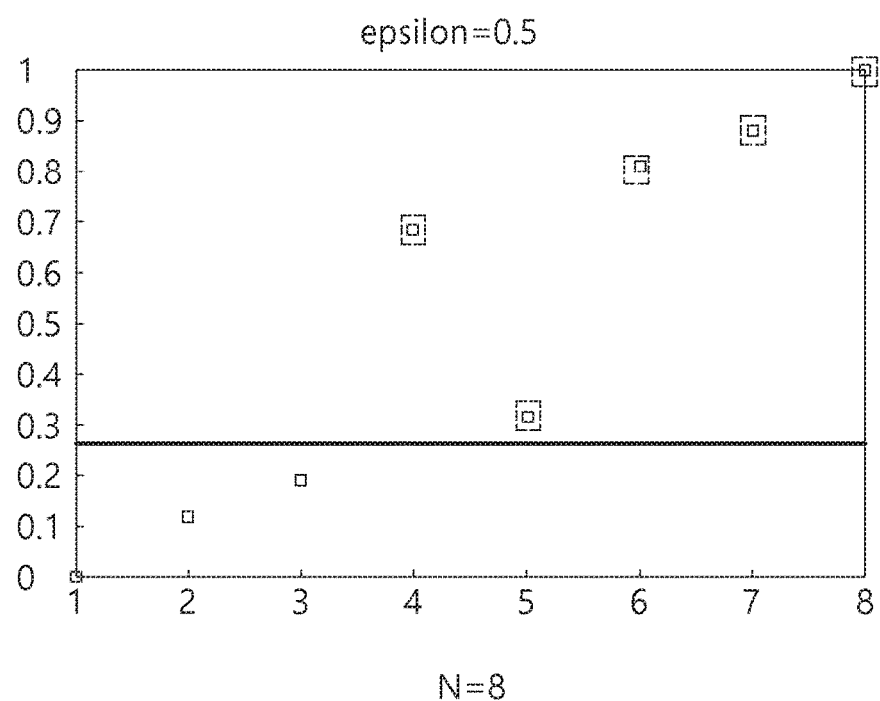
FIG. 4A, FIG. 4B and FIG. 4C show an example of polar coding HARQ method 1 for two or more packets.
Figure 4B:
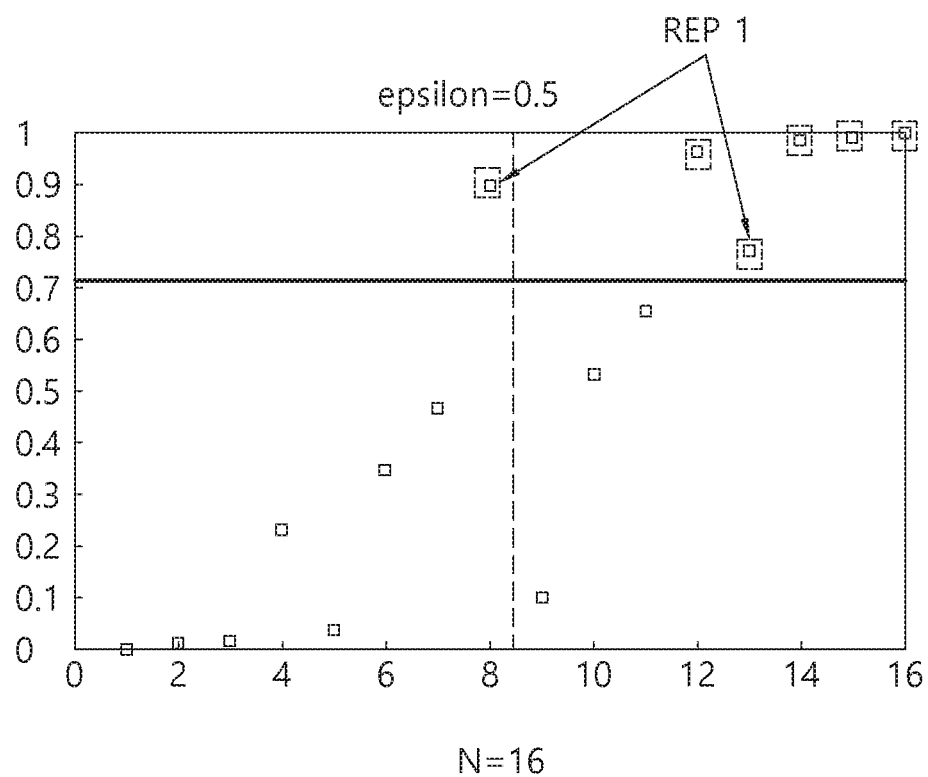

FIG. 4 illustrates a case when method 1 is extended for transmitting two or more packets. Referring to FIG. 4, a horizontal axis represents indexes of bit channels, and a vertical axis represents the mutual information of each bit channel. Herein, the bit channel index is not aligned in accordance with the size of the mutual information. In FIG. 4, boxes indicated in solid lines represent transmission bits. As in the legacy polar coding, transmission bits are categorized as frozen bits and information bits. Transmission bits, which are transmitted through bit channels having mutual information smaller than a predetermined standard size, are referred to as frozen bits. And, transmission bits, which are transmitted through bit channels having mutual information larger than a predetermined standard size, are referred to as information bits. In FIG. 4, a bold horizontal solid line represents the predetermined standard. Additionally, boxes indicated in dotted lines (hereinafter referred to as dotted boxes) represents information bits. The transmission bits that are not marked in boxes indicated in dotted lines correspond to the frozen bits. FIG. 4A illustrates a first packet (having a code length of 8). FIG. 4B illustrates a case when a first packet is combined with a second packet (having a total combined code length of 16). Herein, among the 16 bit channels, the first 8 bit channels correspond to the second packet (and, the next 8 bit channels correspond to the first packet).

As shown in FIG. 4, REP coding is performed for bit channels having the smallest mutual information in the first packet (i.e., the $5^{th}$ bit channel in FIG. 4A, and the $13^{th}$ bit channel in FIG. 4B). More specifically, by performing REP coding by using one bit channel, among the 8 bit channels that are being added due to the second packet, (i.e., the $8^{th}$ bit channel), the information that was transmitted through the bit channel having the smallest mutual information is retransmitted.

Figure 4C:
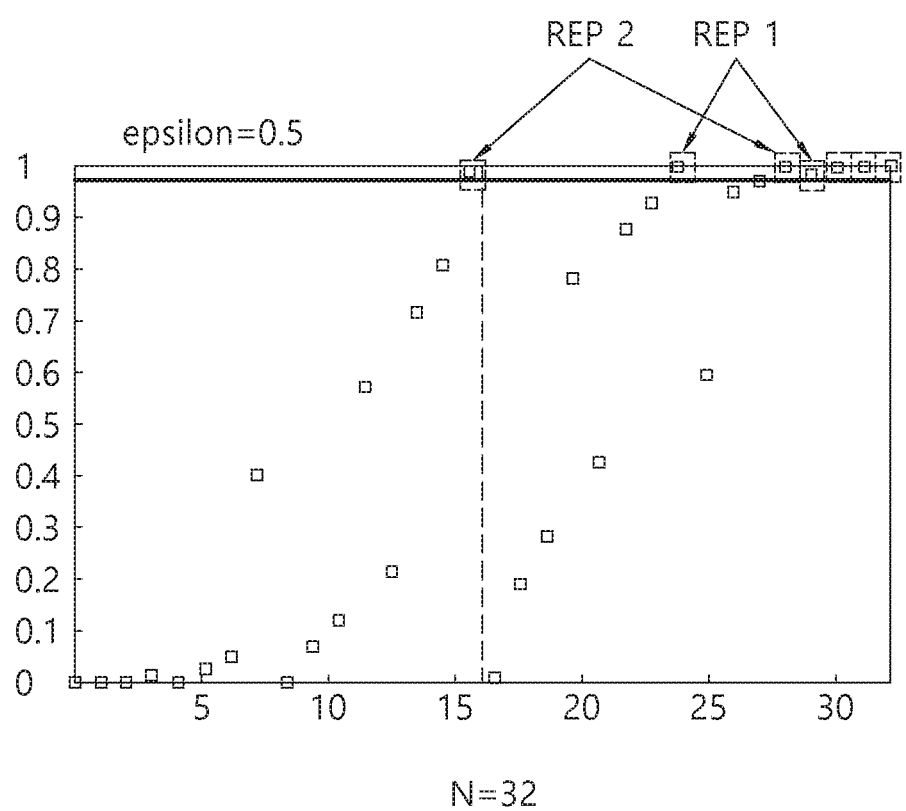

FIG. 4C shows a packet, which is configured by combining a first packet (having a code length of 8), a second packet (having a code length of 8), and a third packet (having a code length of 16), having a total combined code length of 32. Herein, among the 32 bit channels, the first 16 bit channels correspond to the third packet (and, the next 8 bit channels correspond to the second packet, and the last 8 bit channels correspond to the first packet). In the third packet, one bit channel (the $16^{th}$ bit channel in FIG. 4C) has a higher mutual information than the bit channel having the smallest mutual information among the bit channels through which the information was transmitted in the first packet and the second packet. Therefore, REP coding is used through this bit channel. In this case, the information bit that is being REP coded corresponds to an information bit having the smallest mutual information among the information bits being transmitted through the first packet and the second packet. In FIG. 4A, the code rate of the first packet is 5/8. And, in case of FIG. 4B, wherein the first packet is combined with the second packet, the code rate is 5/16. And, in case of FIG. 4C, wherein three packets are combined, the code rate is 5/32.

In method 1, some of the information bits are REP coded, and, then, polar coding is performed afterwards. Therefore, the receiving end should perform both polar coding and REP decoding. At this point, in order to achieve an optimal decoding performance, the receiving end performs list decoding. For example, referring to FIG. 4B, the first packet and the second packet are combined to have a total code length of 16 codes. Just as the legacy (or conventional) decoding method of polar coding, the decoding process starts from the first bit. In FIG. 4B, among the given codes, the first transmission bit to $7^{th}$ transmission bit correspond to frozen bits. Therefore, when performing the actual decoding, the first information bit corresponds to the $8^{th}$ bit. However, the $8^{th}$ information bit is REP coded with the $13^{th}$ information bit. In other words, the $8^{th}$ information bit and the $13^{th}$ information bit correspond to the same information bit. Therefore, a hard decision is not made on the $8^{th}$ transmission bit (first information bit), and list decoding is performed, wherein the list decoding process considers two branches considering the possibilities of the information bit being equal to 0 or 1. In order words, one branch continuously performing the decoding of the next information bits under the assumption that the information bit is equal to 0, and another branch continuously performing the decoding of the next information bits under the assumption that the information bit is equal to 1. Each branch makes a hard decision on the next information bit (i.e., the $12^{th}$ transmission bit). Then, decoding is to be performed on the $13^{th}$ transmission bit. In this case, the $13^{th}$ information bit should be identical to the $8^{th}$ information bit. Accordingly, a final hard decision is made by adding a log likelihood ratio (LLR) value of the $13^{th}$ transmission bit to the LLR value of the $8^{th}$ transmission bit. A bit hard decision is made at this point. When a hard decision is made between 0 and 1, among the two branches that have existed, the branch providing the higher LLR value is selected, and the remaining branch is disregarded. The above-described decoding method is referred to as the list decoding method. Since this decoding method performs REP decoding and polar decoding at the same time, an optimal decoding performance may be achieved. However, one of the disadvantages of the list decoding method is that the decoding complexity is increased. For example, after generating two branches, before making a final hard decision on the generated branches, if another REP-coded information bit is encountered, the number of branches may be increased to 4. Similarly, before making a final hard decision on the two information bits, if another third information bit is encountered, the number of branches may be increased to 8. Eventually, a number of branches corresponding to an ascending power of the number of REP-coded information bits that should be simultaneously considered is required. Therefore, according to the number of simultaneously REP-coded information bits, the decoding complexity may be increased.

Method 1 of FIG. 4 may be modified or varied to a plurality of other method types. Firstly, since it is difficult to calculate or measure the mutual information in an actual communication environment, the allocation of REP information bits or REP-coded bits may be selected by using a bit error rate (BER) instead of the mutual information. Also, although FIG. 4 only shows a case when REP coding is performed by using 2 bit channels, in an actual communication environment, REP coding may be performed by using two or more bit channels. In other words, length-3 REP-coding or length-4 REP-coding allowing three information bits to have the same value may be considered. Furthermore, although FIG. 4 shows a case when the lengths of the first packet, the second packet, and the third packet are given to be equal to an ascending power of 2, such as 8, 8, and 16, respectively, in an actual transmission, the length of each packet may be equal to a general value. More specifically, in case 3 packets are being transmitted, the lengths of each packet may be respectively equal to $N_1$, $N_2$, and $N_3$, and such values are not necessarily required to be equal to the ascending power of 2.

FIG. 5 shows an example of polar coding HARQ method 2 for two or more packets.

Figure 5A:
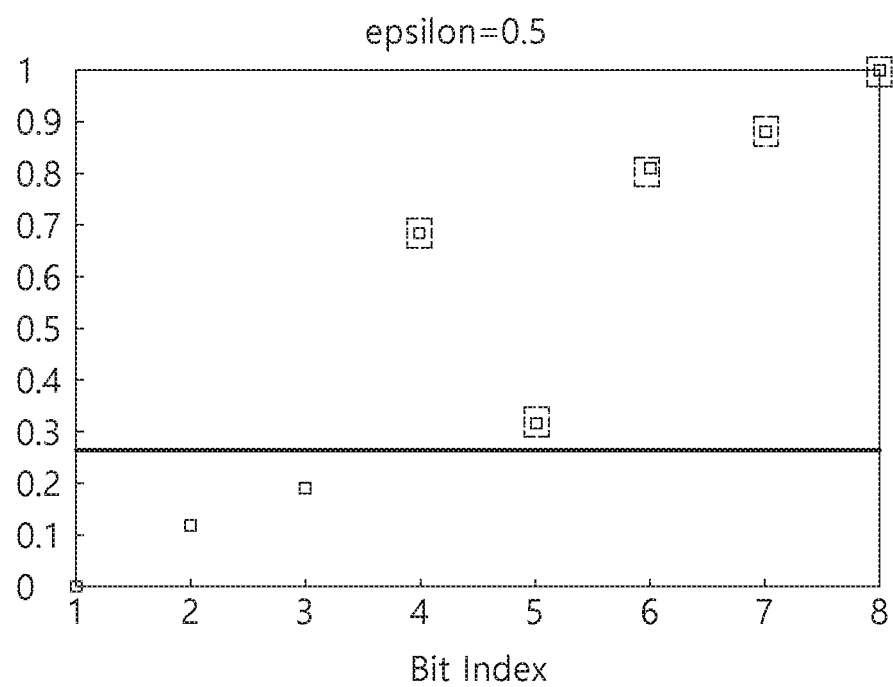
FIG. 5A, FIG. 5B and FIG. 5C show an example of polar coding HARQ method 2 for two or more packets.
Figure 5B:
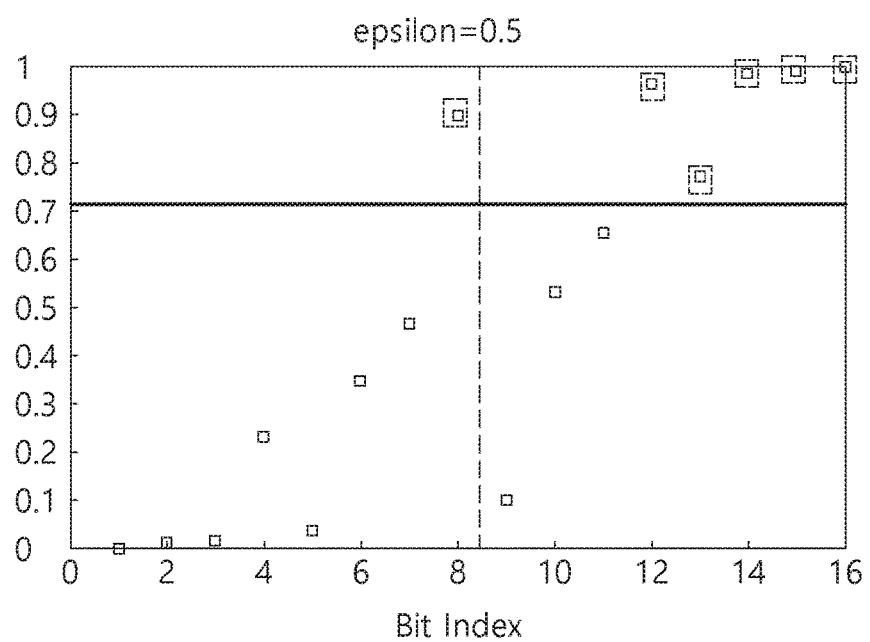
Figure 5C:
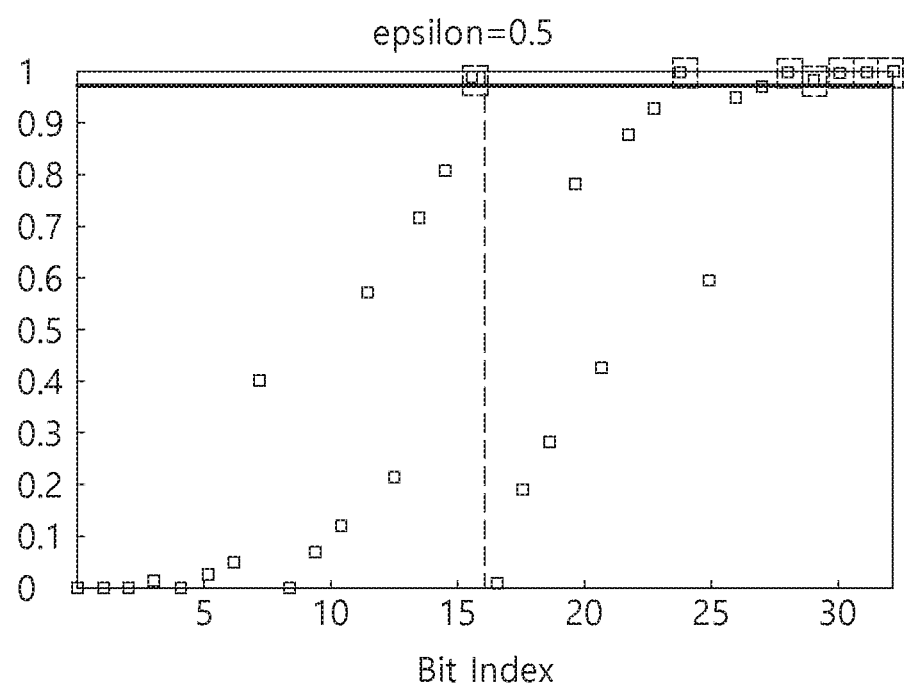

FIG. 5 illustrates a case when method 2 is extended for transmitting two or more packets. The basic concept is the same as FIG. 4. However, the difference between FIG. 5 and FIG. 4 is that a completely new information bit is transmitted by using a bit channel, which is generated when using a new packet, and which has an excellent status, instead of transmitting a REP-coded information bit. In FIG. 5A, the code rate of the first packet is 5/8. And, in case of FIG. 5B, wherein the first packet is combined with the second packet, the code rate is 6/16. And, in case of FIG. 5C, wherein three packets are combined, the code rate is 7/32.

1.2 Combination Method 1 Combining Method 1 and Method 2

FIG. 6 shows an example of polar coding HARQ combination method 1.

Figure 6A:
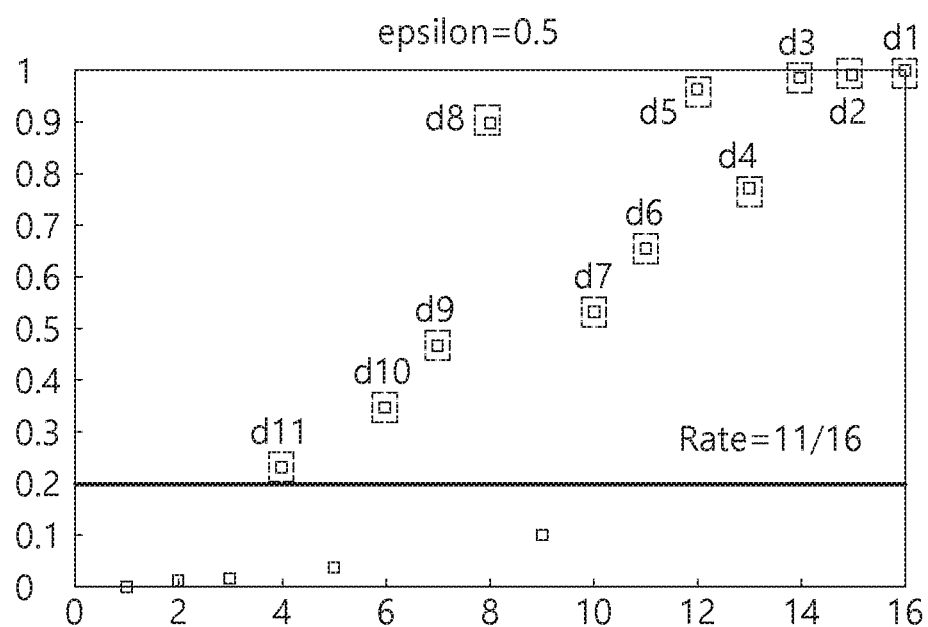
FIG. 6A, FIG. 6B, FIG. 6C, FIG. 6D and FIG. 6E show an example of polar coding HARQ combination method 1.

In the previous section, each of method 1 and method 2 was respectively described. Hereinafter, a general method combining the two methods will be considered. In this specification, this method will be referred to as polar coding HARQ combination method 1. FIG. 6 shows the concept of this method. FIG. 6A illustrates a first packet having a length of 16. Among the 16 transmission bits, with the exception for 5 frozen bits, 11 information bits exist. Each information bit is indicated as $d_i$ (wherein i=1, 2, ..., 11). In this case, the code rate is 11/16. Hereinafter, a second packet being configured of 16 transmission bits will be additionally transmitted. In other words, a length-32 packet is configured by combining the first packet and the second packet. At this point, 3 bit channels exist ($14^{th}$, $15^{th}$, and $16^{th}$ bit channels), which may be used for information transmission in the added second packet. 4 different methods for allocating information bits for the 3 bit channels may be considered. These methods are respectively shown in FIG. 6B, FIG. 6C, FIG. 6D, and FIG. 6E.

Figure 6B:
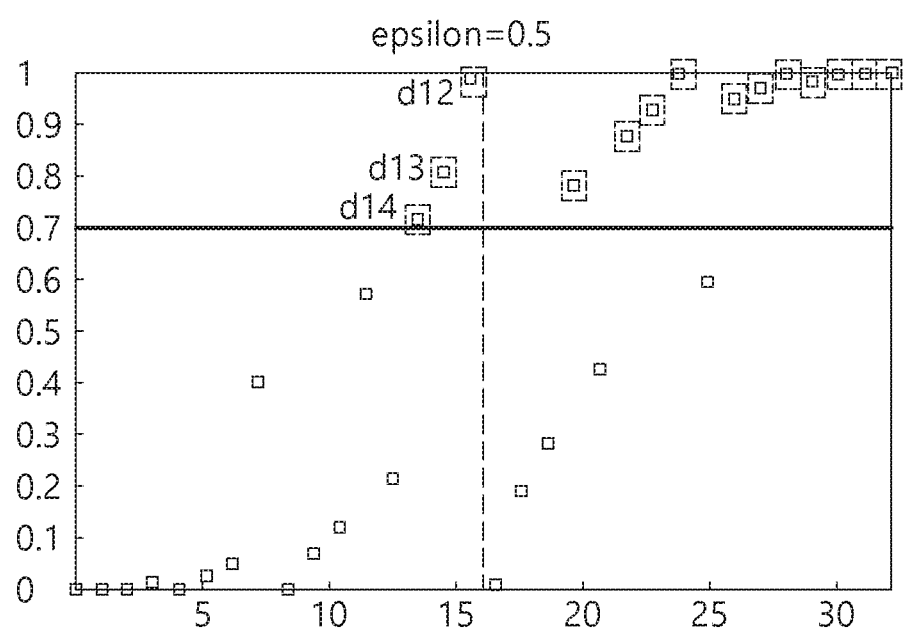
Figure 6C:
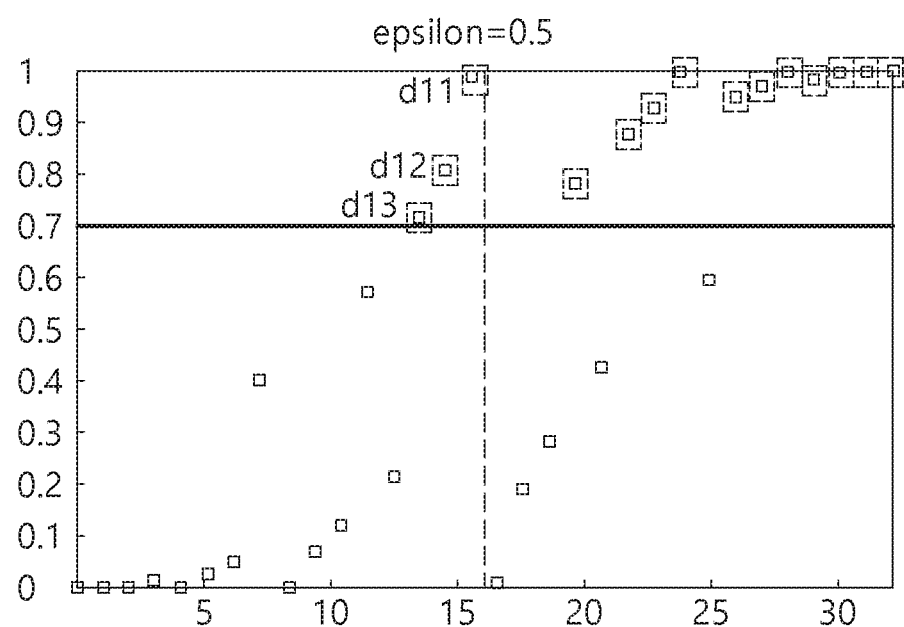
Figure 6D:
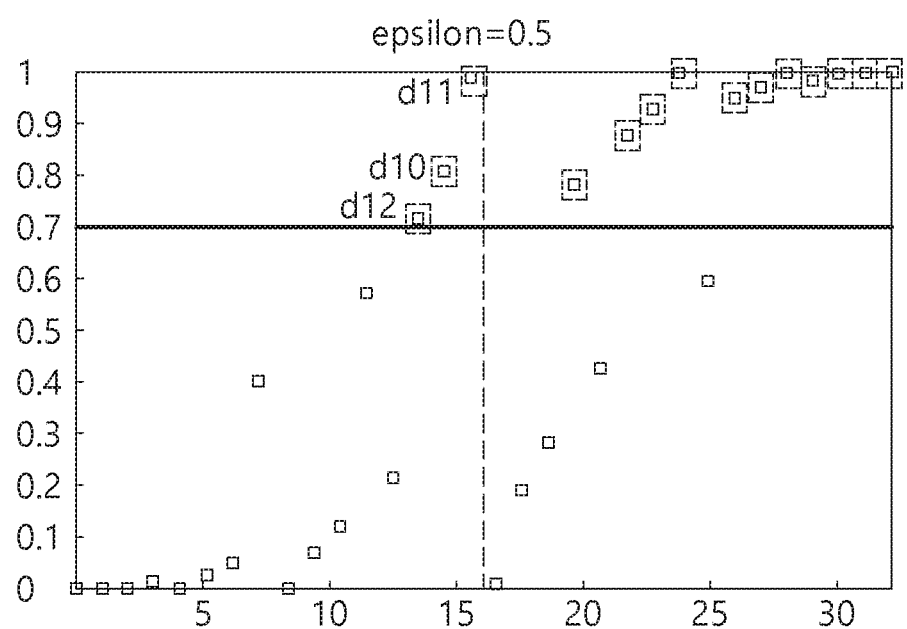
Figure 6E:
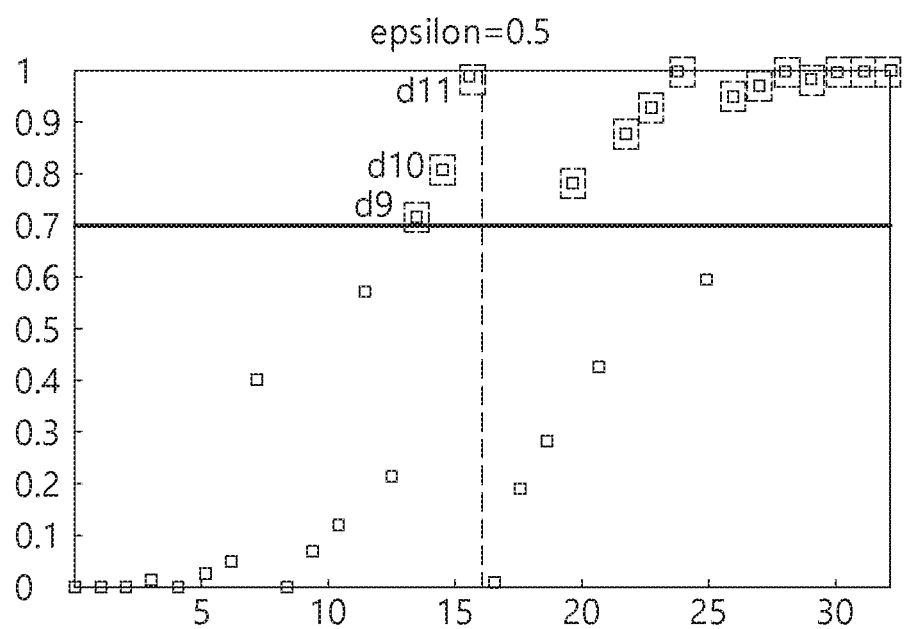

Firstly, as shown in FIG. 6B, 3 new information bits (d12, d13, d14) are transmitted through 3 bit channels. More specifically, not a single information bit of the first packet is REP coded by the information bit of the second packet. The code rate for such transmission case may be indicated as $Rate_1$, and the corresponding value is given as $Rate_1=14/32$. Additionally, a frame decoding error, which occurs when decoding the above-described combined packet having the length of 32, may be indicated as $FER_1$. Secondly, as shown in FIG. 6C, two new information bits (d12, d13) and one REP coded information bit (d11) are transmitted through 3 bit channels. In this case, the code rate is given as $Rate_2=13/32$, and the frame decoding error that occurs in this case is indicated as $FER_2$. Thirdly, as shown in FIG. 6D, one new information bit (d12) and two REP coded information bits (d10, d11) are transmitted through 3 bit channels. In this case, the code rate is given as Rate$_3$=12/32, and the frame decoding error that occurs in this case is indicated as FER$_3$. Finally, as shown in FIG. 6E, three information bits (d9, d10, d11) are REP coded and then transmitted through 3 bit channels. In this case, the code rate is given as Rate$_4$=11/32, and the frame decoding error that occurs in this case is indicated as FER$_4$. When comparing the 4 different transmission methods, the following result may be obtained.

FER$_1$>FER$_2$>FER$_3$>FER$_4$

Rate$_1$>Rate$_2$>Rate$_3$>Rate$_4$

Referring to the results presented above, which one of the 4 transmission methods achieves the best performance cannot be clearly determined. For example, since the first method (FIG. 6B) has the highest likelihood of having a frame error (FER$_1$), the first method is not advantageous in light of the likelihood of errors. However, in light of the transmission rate, since the first method has the highest transmission rate (Rate$_1$), the first method is advantageous in light of the transmission rate. In order to resolve such problems, in the following section, the proposed combination method 1 will be optimized by using the concept of a throughput.

1.3 Combination Method 1 Having a Maximum Throughput

FIG. 7 shows a code rate and a frame error rate (FER) of polar coding HARQ combination method 1.

A transmission throughput indicates a code rate of a transmission that is performed without any error, and the throughput η may be calculated by using the code rate and the FER, as shown below in the following equation.

$$\eta = \frac{K \times (1 - FER)}{N} = \text{Rate} \times (1 - FER) \qquad \text{[Equation 1]}$$

Figure 7A:
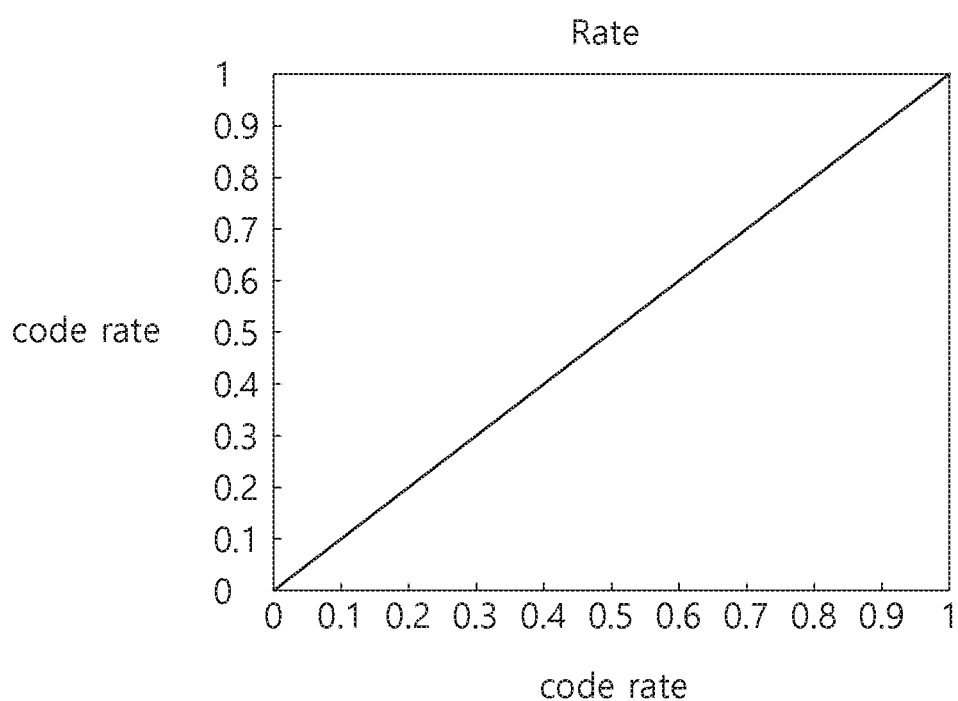
FIG. 7A and FIG. 7B show a code rate and a frame error rate (FER) of polar coding HARQ combination method 1.
Figure 7B:
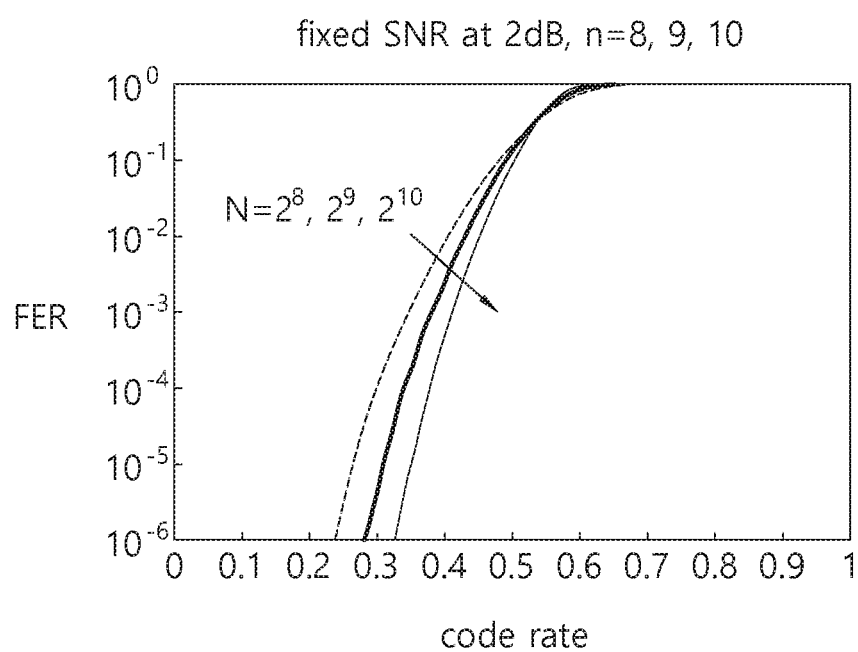

Herein, K represents a number of information bits. FIG. 7 shows the code rate and the FER. In FIG. 7A, both the horizontal axis and the vertical axis indicate the code rate. Therefore, in FIG. 7A, the code rate is illustrated as a straight line having an inclination of 1. FIG. 7B illustrate the FER. Herein, the three curves respectively indicate the FER that corresponds to case when the code length is equal to 256, 512, and 1024. Herein, in case of using a Gaussian channel, the FER may be calculated very efficiently and mathematically by using diverse methods (e.g., the Gaussian approximation method).

FIG. 8 shows a method of obtaining a throughput from the code rate and the frame error rate (FER) of polar coding HARQ combination method 1.

Figure 8B:
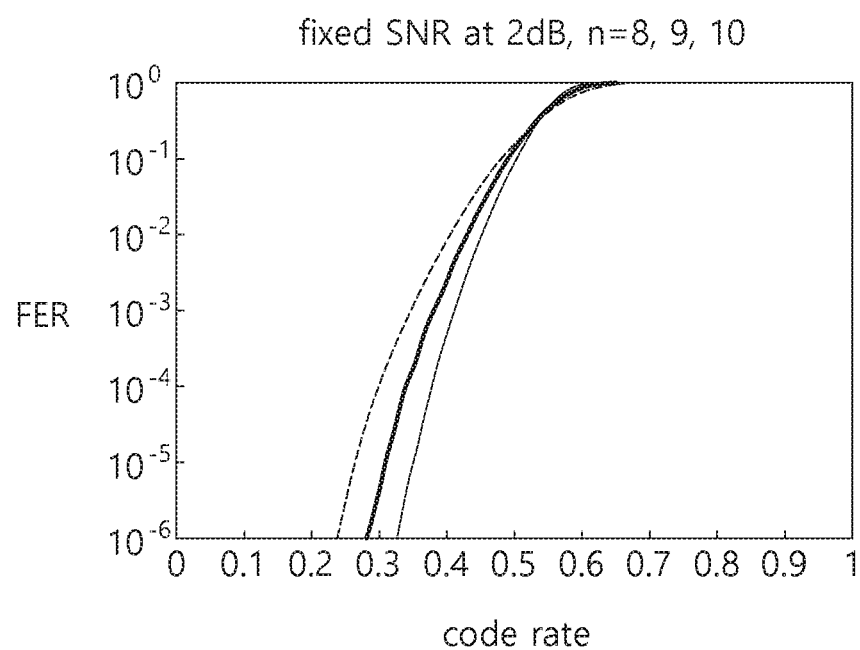

A method for calculating a throughput from the code rate and the FER is shown in FIG. 8A. And, as shown in the throughput graph of FIG. 8B, the throughput increases in accordance with an increase in the code rate. Then, when the code rate passes a predetermined point, the throughput decreases. In the example presented in FIG. 8B, regardless of the code length N, a maximum throughput is achieved when the code rate is equal to approximately 0.48.

Figure 9:
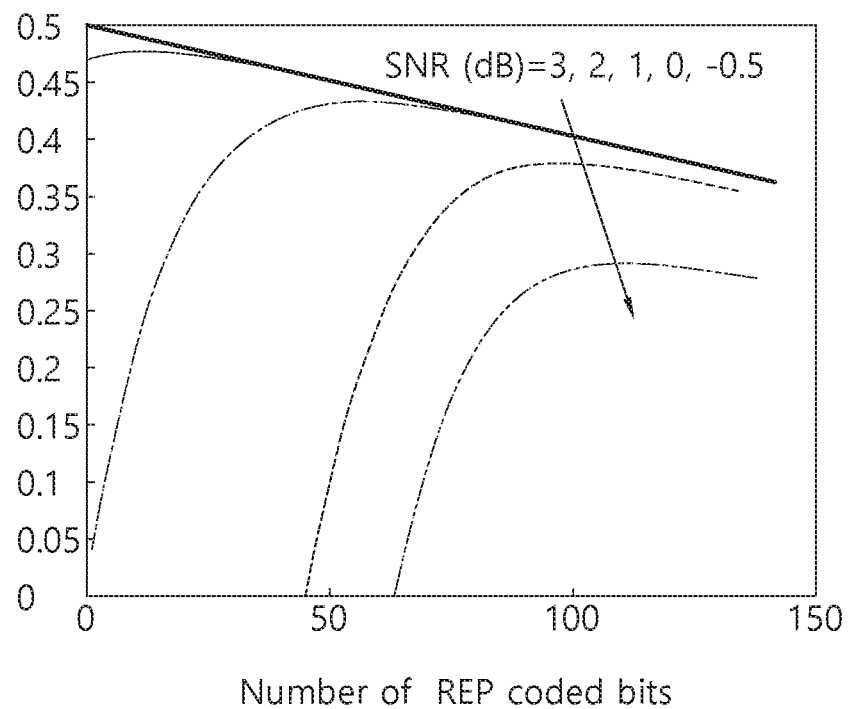
FIG. 9 shows a throughput according to repetition (REP) coding in polar coding HARQ combination method 1.

FIG. 9 shows a throughput according to repetition (REP) coding in polar coding HARQ combination method 1.

Hereinafter, combination method 1 may be optimized so that the throughput can be maximized. In FIG. 9, the horizontal axis represents a number of REP coded bits, and the vertical axis represents the throughput. FIG. 9 illustrates a case when the length of the first packet is equal to 512, and the length of the second packet is equal to 512, and when a maximum of 512 information bits are transmitted through the code being configured by combining the first packet and the second packet and having a combined length of 1024. If the REP coding is not used at all, all of the 512 information bits are transmitted. And, in this case, the code rate may be indicated as Rate=512/1024=0.5. A case when the REP coding is performed (or used) for 100 information bits will be assumed as described below. In other words, a total of 100 bits being repeated one time for each of the 100 information bits exists. In this case, since the number of information bits each being different from one another that are actually being transmitted is equal to 412, the code rate may be indicated as Rate=412/1024=0.4. FIG. 9 shows an example of 5 different throughputs respective to channel SNRs being equal to 3, 2, 1, 0, −0.5 dB. In case the channel SNR is excellent (e.g., 3 dB), if the REP coding is not used at all, the throughput is given as 0.5, and the throughput decreases as the number of bits being used for the REP coding increases. This is because, in case the channel SNR level is very high, the FER becomes approximate to 0, and the throughput is given as η=Rate. Based on this result, it will be apparent that, in case the SNR is very high, and in case REP coding is not used at all, a maximum throughput may be gained. For example, as shown in FIG. 6B, in case the information bits being transmitted through the second packet correspond to completely new information bits and not REP-coded bits, a maximum throughput may be ensured. Conversely, in case the channel SNR is low, a different result may be obtained. For example, referring to FIG. 9, when considering a case when the channel SNR is equal to −0.5 dB, which corresponds to a case when the channel SNR is very low, the throughput is equal to 0 until the number of REP-coded information bits reaches approximately 70. This is because, if a large number of REP-coded information bits is not used due to the very poor status of the channel, the FER may become very close to 1, and, in this case, the throughput becomes very close to 0. If the number of REP-coded information bits is further increased, the FER value decreases, and, as a result, the throughput increases. However, if the number of REP-coded information bits is increased to a predetermined value or more, the throughput may decrease once again. This is because, if the number of REP-coded information bits is increased to a predetermined value or more, the FER may become closer to 0. However, as a result, the code rate may decrease excessively. In the exemplary case when the channel SNR is equal to −0.5 dB, it is apparent that the throughput reaches its maximum level when the number of REP-coded information bits is equal to approximately 110.

In conclusion, in order to optimize the proposed combination method 1, a number of new information bits and a number of REP-coded bits that are to be transmitted through the bit channels, which are added by the second transmitted packet, may be determined so that the throughput can be maximized. As described above, optimizing the combination method 1 so as to maximize the throughput may also be applied in a case of transmitting two or more packets. In this case, a relationship between a previous packet and a next packet should be considered each time, and the number of REP-coded bits (or the number of new information bits) is determined so that the throughput can be maximized each time a new packet is transmitted.

1.4 Combination Method 1 Reducing Decoding Complexity

This section proposes polar coding HARQ combination method 2. As described above in the previous section, since method 1, which is presented in FIG. 4, uses REP coding, the receiving end is required to use list decoding in order to simultaneously perform REP decoding and polar decoding. However, when performing such decoding, since a number of branches proportional to an ascending power of the number of REP-decoded bits is required, the level of decoding complexity may become very high. Similarly, since REP coding is also used in combination method 1, which is proposed in the previous section, combination method 1 is also disadvantageous in that the decoding complexity in the receiving end also increases. In order to reduce such decoding complexity, combination method 2 is proposed as described below.

FIG. 10 shows an example of polar coding HARQ combination method 2.

Figure 10A:
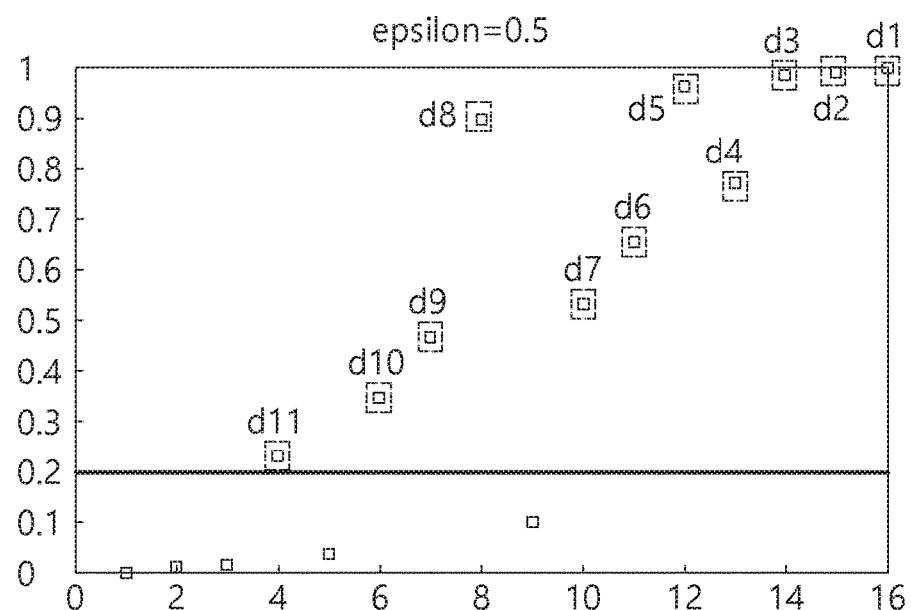
Figure 10B:
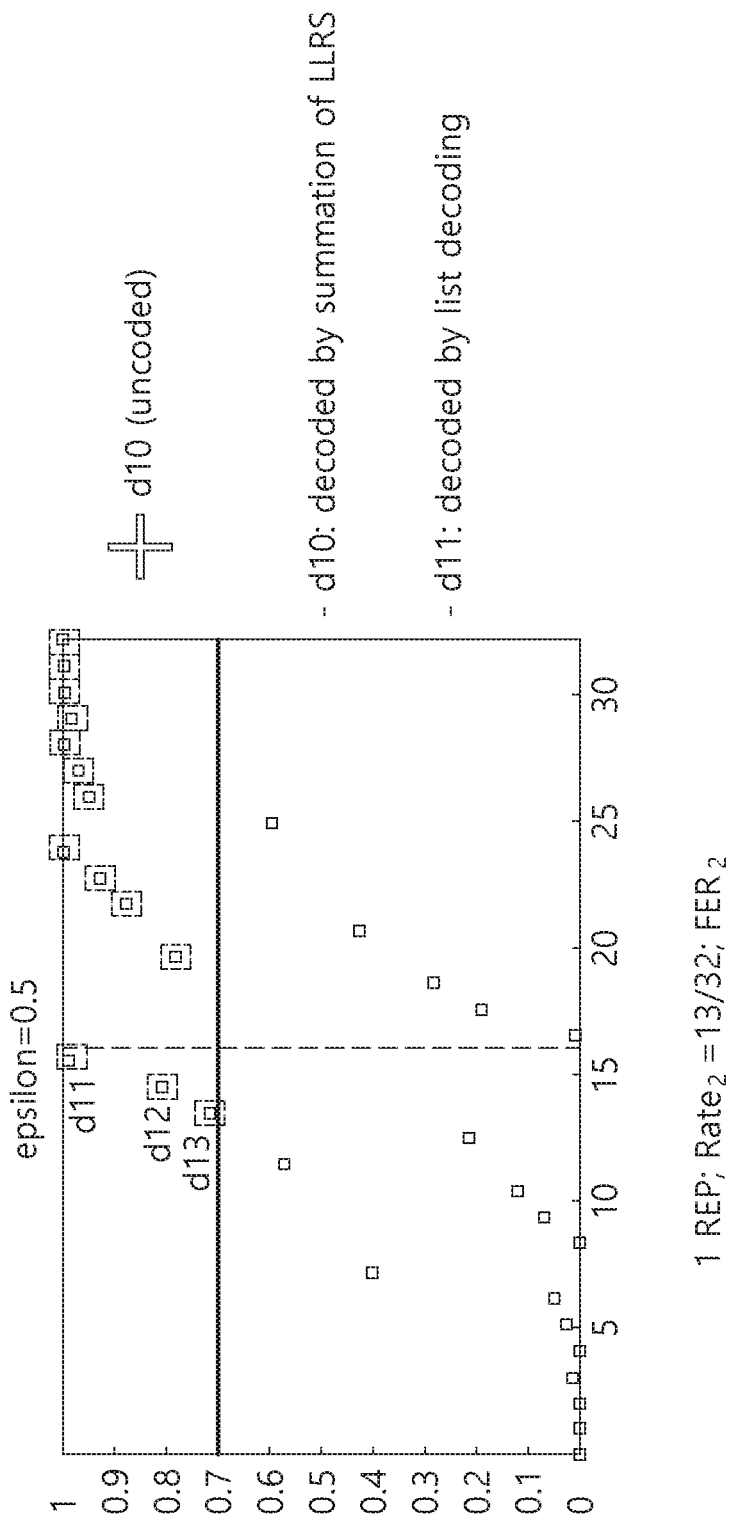

FIG. 10 illustrates the concept of combination method 2. FIG. 10A shows a first packet having a code length of 16, and FIG. 10B and FIG. 10C show a case when a second packet having the code length of 16 is combined with a first packet having the code length of 16, so as to have a combined length of 32 (herein, the code of FIG. 10A is identical to the code shown in FIG. 6A). FIG. 10B and FIG. 10C shows a transmission method that is available in combination method 2. In FIG. 10B, 3 information bits (d11, d12, d13) are transmitted through the 3 best bit channels of the second packet. Herein, since d11 corresponds to an information bit that has already been transmitted by the first packet, d11 is transmitted by the second packet by using the REP-coding method. And, d12 and d13 are new information bits. Herein, all of the 3 information bits (d11, d12, d13) are polar coded and then transmitted. Also, in addition to such 3 information bits of the second packet, one information bit (d10) is transmitted in a REP-coded format along with the second packet (since d10 has already been transmitted by the first packet, this corresponds to REP coding). Herein, even though d10 is a REP-coded bit, d10 is not polar coded. In this meaning, the term "uncoded" is used in FIG. 10B. Herein, since d11 is polar coded and REP-coded at the same time, the receiving end should perform decoding by using list decoding. However, since d10 is only REP-coded, the receiving end measures its LLR value, and, then, the measured LLR value is added to an LLR value corresponding to d10, which was transmitted through the first polar-coded packet, and, then, decoding is immediately performed. Thus, the decoding complexity does not increase due to d10.

FIG. 10C illustrates another operation mode of combination method 2. Herein, in addition to 3 new information bits (d12, d13, d14) of the second polar coded packet, 2 REP-coded and non-polar coded bits (d10, d11) are transmitted for REP coding. In this case, the receiving end measures only the LLR values of d10 and d11 and then adds the measured LLR values to respective LLR values of d10 and d11, which were received by the first packet, and, then, the receiving end performs polar decoding. Accordingly, the problem of having the decoding complexity increased due to REP coding does not occur.

1.5 Method for Determining the Code Rate of a Mother Code and the Length of Sub-Packets in Polar Coding HARQ When designing polar coding HARQ, a mother code should be configured to have a sufficiently long code length and a sufficiently low code rate, and such mother code is truncated to a plurality of sub-packets. At this point, when the length of the sub-packets is determined, the sub-packets are formed by truncating the mother code as much as the determined sub-packet length starting from bit channel located at a rearmost part of the mother code. At this point, the issue of how to determine the code rate of the mother code and the length of the sub-packets become the issue of HARQ design.

FIG. 11 shows a code rate and a frame error rate (FER) of polar coding HARQ combination method 2.

Figure 11A:
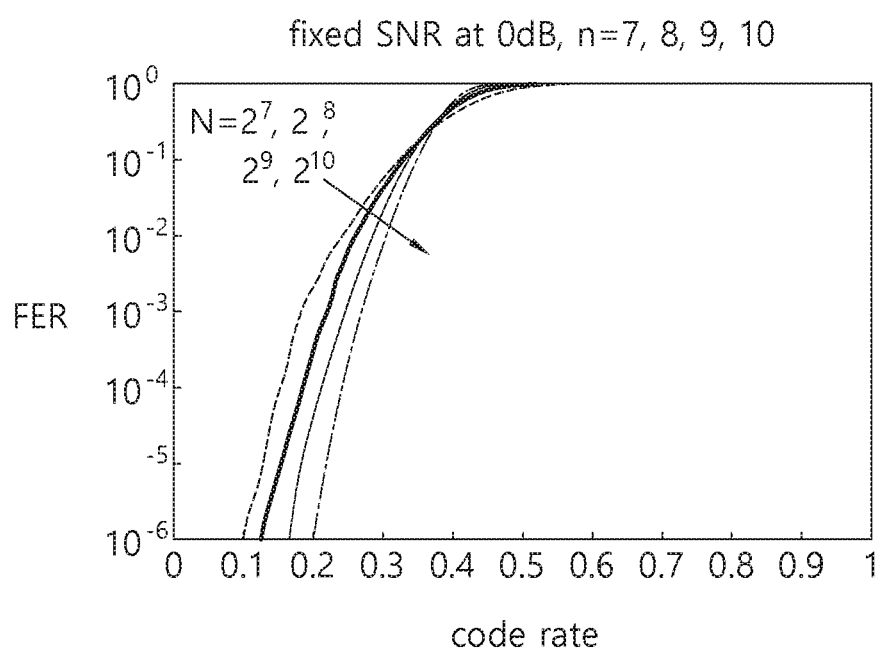
FIG. 11A and FIG. 11B show a code rate and a frame error rate (FER) of polar coding HARQ combination method 2.
Figure 11B:
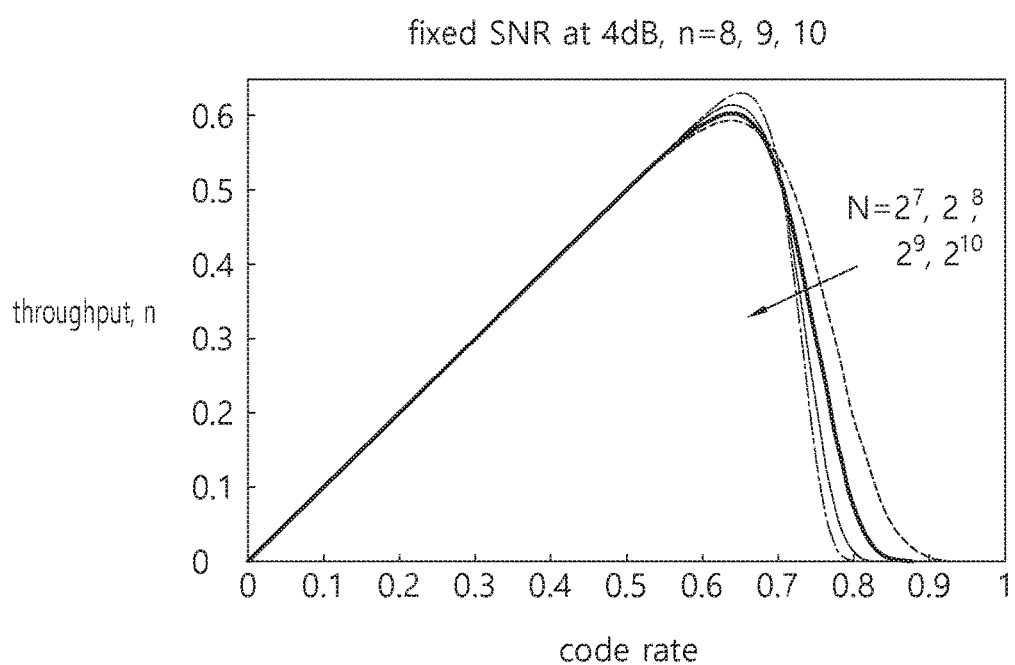

FIG. 11 illustrates the FER corresponding to 4 different cases, wherein the code length corresponds to 128, 256, 512, and 1024, and the respective throughput. It will be assumed that the transmitting end is not accurately informed on the channel information, i.e., the channel SNR. On the other hand, it is assumed that the transmitted end is only informed of the channel SNR range. In an example shown in FIG. 11, it is assumed that the transmitting end is informed of the following information, in a worst case, the channel SNR is equal to 0 dB, and, in a best case, the channel SNR is equal to 4 dB. FIG. 11A illustrates the FER corresponding to the worst case (i.e., when the channel SNR is equal to 0 dB), and FIG. 11B illustrates the throughput corresponding to the best case (i.e., when the channel SNR is equal to 4 dB). Firstly, in the HARQ, based on the worst channel condition, the mother code may be configured so that the FER can be maintained to a value equal to a predetermined standard value or less. For example, it will be assumed that, when it is given that the mother code length is equal to 512, and when the corresponding mother code is decoded, the HARQ is designed so that the FER does not exceed $10^{\wedge}(-6)$. In order to satisfy this condition, it is apparent (from FIG. 11A) that the code rate should not exceed approximately 0.16. Therefore, the code rate of the mother code is determined to be equal to 0.16. In this case, the given number of information bits is equal to approximately 0.16×512=82.

Hereinafter, it will be assumed that one sub-packet is formed by truncating the mother code. A sub-packet having the length of 256 or a sub-packet having the length of 128 may be formed by truncating the mother code having the code length of 512. (Evidently, sub-packets having other lengths may also be formed. However, for simplicity, comparison will only be made based on the two cases that are mentioned above.) Since the sub-packet is formed by truncating the end part (or rear part) of the mother code, the number of information bits that are actually transmitted may be less than 82. However, in this section, the number of information bits will be given as 82, for simplicity. The length of the sub-packet may be determined so that the throughput can be maximized, assuming that the channel condition is at its best state (i.e., when the SNR is equal to 4 dB). Reference will now be made to FIG. 11B. Firstly, it will be assumed that the length of the sub-packet is equal to 256. In this case, since the code rate is given as 82÷256=0.32, it will be apparent from the drawing that the respective throughput is given as approximately 0.4. It will now be assumed that the length of the sub-packet is equal to 128. In this case, since the code rate is given as 82÷128=0.64, it will be apparent from the FIG. 11B that the respective maximum throughput is given as approximately 0.63. Therefore, in case of forming one sub-packet from the mother code, it can be known that a maximum throughput can be obtained by forming a sub-packet having the length of 128.

1.6 Non-Uniform REP-Coded Polar Coding

Figure 12:
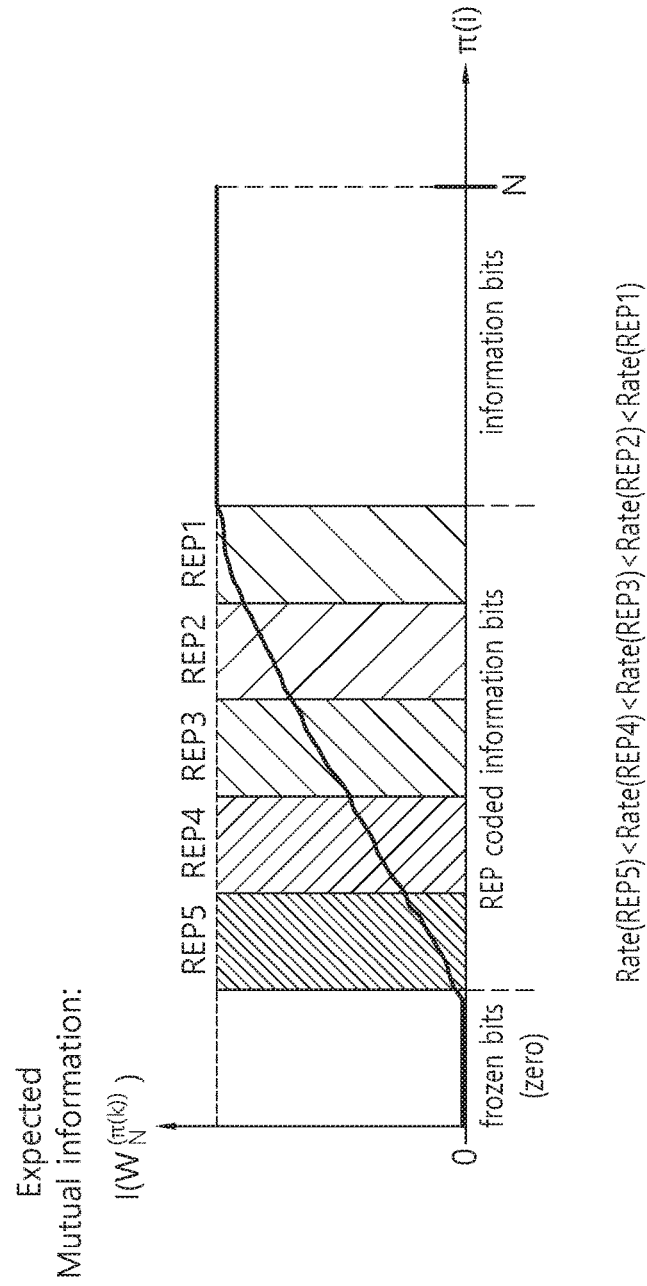
FIG. 12 show an example of non-uniform REP-coded polar coding.

FIG. 12 shows an example of non-uniform REP-coded polar coding.

In case the transmitting end is not accurately information of the channel information in advance, by non-uniformly applying REP coding instead of using the HARQ, polar coding may be efficiently configured. In this section, it will be assumed that, although the transmitting end is not accurately informed of the channel SNR, the transmitting end is informed of the distribution of the channel SNR. In this case, as shown in FIG. 12, an average mutual information of each bit channel may be obtained. Referring to FIG. 12, a horizontal axis represents bit channel indexes that are aligned in accordance with an increasing order of the size of the average mutual information, and a vertical axis represents the average mutual information. For bit channels having a very low (or small) average mutual information, frozen bits (generally using zero) are allocated. And, for bit channels having a very high (or large) average mutual information, information bits are allocated. Additionally, for bit channels having an average mutual information that is not too large or not too small, REP coding is additionally applied. In this case, the code rate of the REP coding is varied in accordance with the size of the average mutual information. For example, when the code rate of the REP coding is equal to 0.5, this indicates that the same information bit is repeated 2 times. And, when the code rate of the REP coding is equal to 0.25, this indicates that the same information bit is repeated 4 times. More specifically, as the coding rate of the REP coding becomes lower, the given REP coding achieves a stronger (better) performance against errors. As shown in FIG. 12, for bit channels having a lower average mutual information, the REP coding is also set to have a lower code rate. Conversely, for bit channels having a higher average mutual information, the REP coding is also set to have a higher code rate. By using the above-described method, information bits that are actually being transmitted are eventually transmitted through bit channels having similar average mutual information. And, accordingly, an enhanced performance of polar coding may be expected.

1.7 Physical Layer Security Polar Coding HARQ

FIG. 13 shows an example of polar coding HARQ applying physical layer security in a viewpoint of a receiver. And, FIG. 14 shows an example of polar coding HARQ applying physical layer security in a viewpoint of an eavesdropper.

In this section, a method of applying polar coding HARQ to physical layer security, i.e., secure polar coding HARQ is proposed. In this section, a case when the transmitting end is not informed of the accurate channel information of the legitimate receiver or the eavesdropper will be considered. Nevertheless, it will be assumed that the transmitting end is informed of an expected value of a best channel condition assigned to the receiver. (However, in the aspect of security, this channel value corresponds to a worst case.) In this case, the secure polar coding HARQ is designed as shown in FIG. 13 and FIG. 14. Referring to FIG. 13 and FIG. 14, circles marked in bold lines (hereinafter referred to as bold circles) represent random bits, and boxes marked in dotted lines (hereinafter referred to as dotted boxes) represent information bits. Finally, all boxes marked in solid lines (hereinafter referred to as solid boxes) represent frozen bits. FIG. 13 illustrates mutual information corresponding to a signal received by the legitimate receiver, and FIG. 14 illustrates mutual information corresponding to a signal received by the eavesdropper.

Figure 14A:
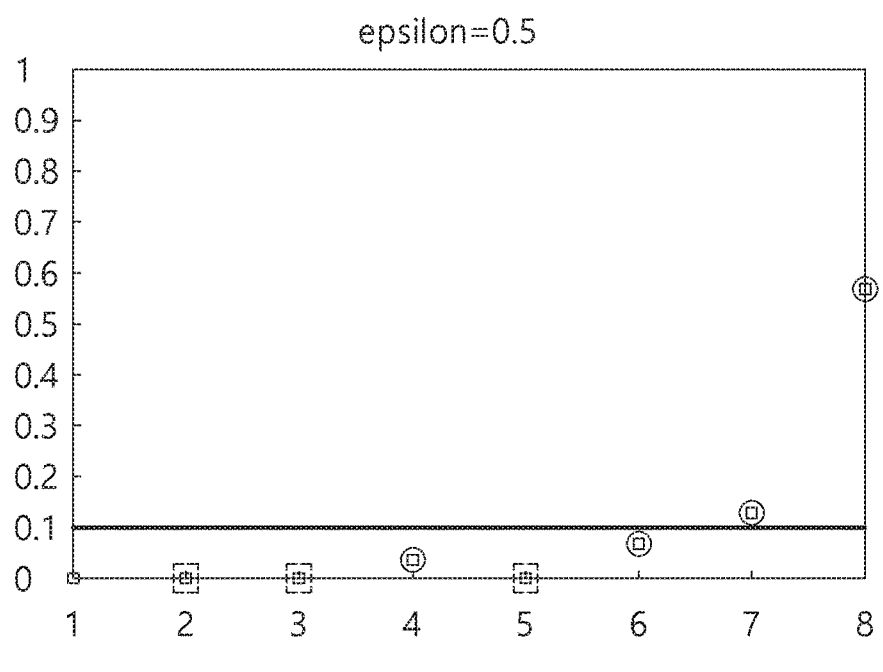
FIG. 14A, FIG. 14B and FIG. 14C show an example of polar coding HARQ applying physical layer security in a viewpoint of an eavesdropper.
Figure 14B:
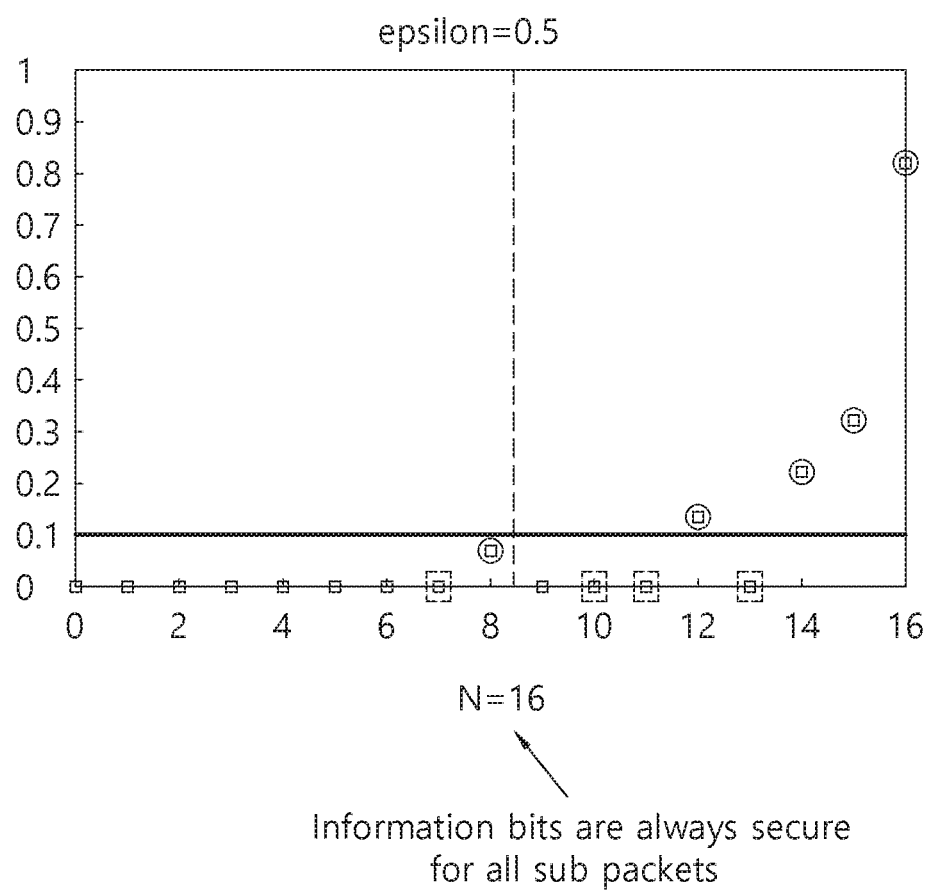
Figure 14C:
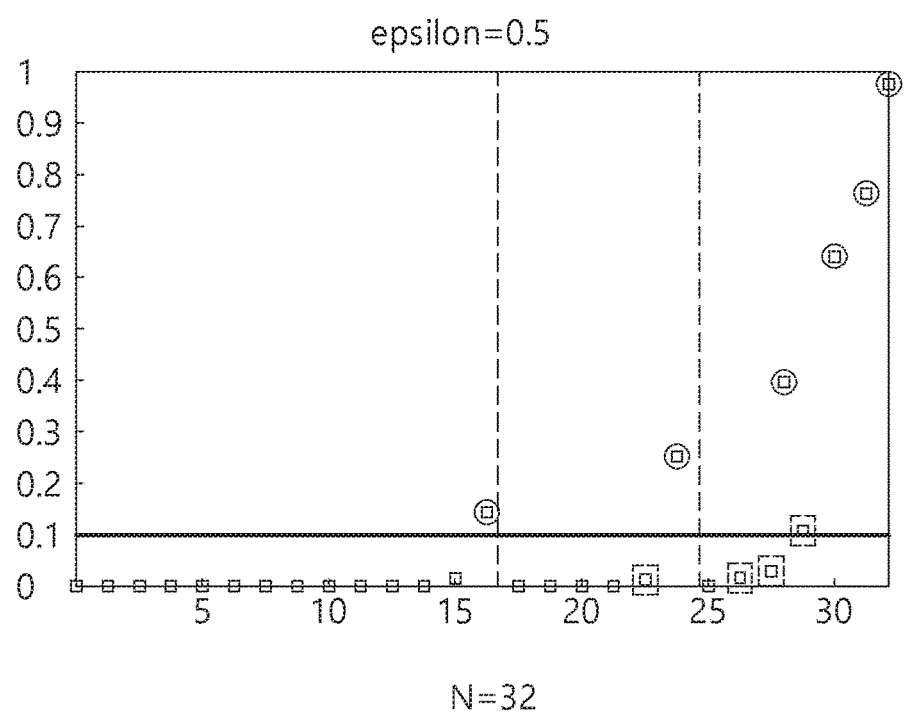

Firstly, the mother code is configured assuming that the eavesdropper is provided with the best channel condition. In case the eavesdropper is provided with the best channel condition, in order to prevent information bits from being decoded by the eavesdropper, a secure polar code is designed so that the mutual information in the bit channel of the eavesdropper does not exceed a predetermined standard value. For example, FIG. 14C illustrates a case wherein such standard value for security is equal to 0.1 (i.e., the bold horizontal line shown in the drawing). More specifically, a random bit is transmitted to bit channels of the eavesdropper having a mutual information that is larger than the standard value for security. In the example shown in FIG. 14C, random bits are transmitted to 6 bit channels having mutual information larger than the standard value.

Reference will now be made to the mutual information of each bit channel in the viewpoint of the legitimate receiver shown in FIG. 13. The information bit being transmitted by performing polar coding should be successfully decoded by the legitimate receiver without any error. Therefore, in the viewpoint of the legitimate receiver, the information bits should only be transmitted through bit channels having mutual information equal to a predetermined standard value or more. In FIG. 13, the standard of mutual information is given as 0.9, and this standard is indicated as a bold horizontal line. With the exception for the bit channels being allocated with 9 random bits configured in the mother code shown in FIG. 14, 4 bit channels having mutual information being equal to the standard value or more exist. Accordingly, information bits are transmitted through such bit channels.

Figure 13A:
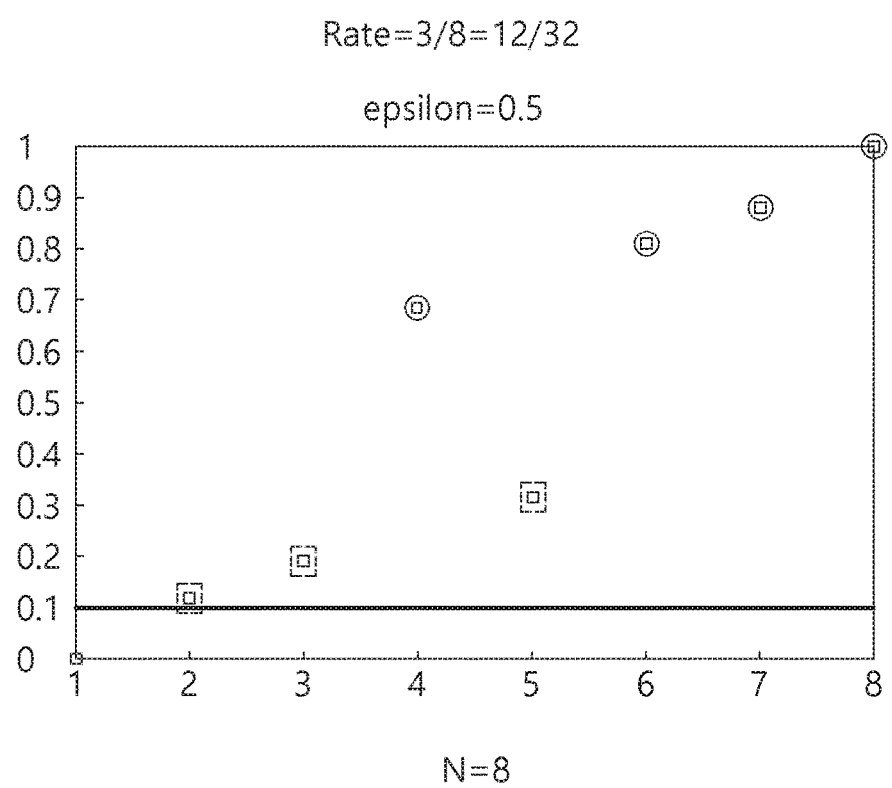
FIG. 13A, FIG. 13B and FIG. 13C show an example of polar coding HARQ applying physical layer security in a viewpoint of a receiver.
Figure 13B:
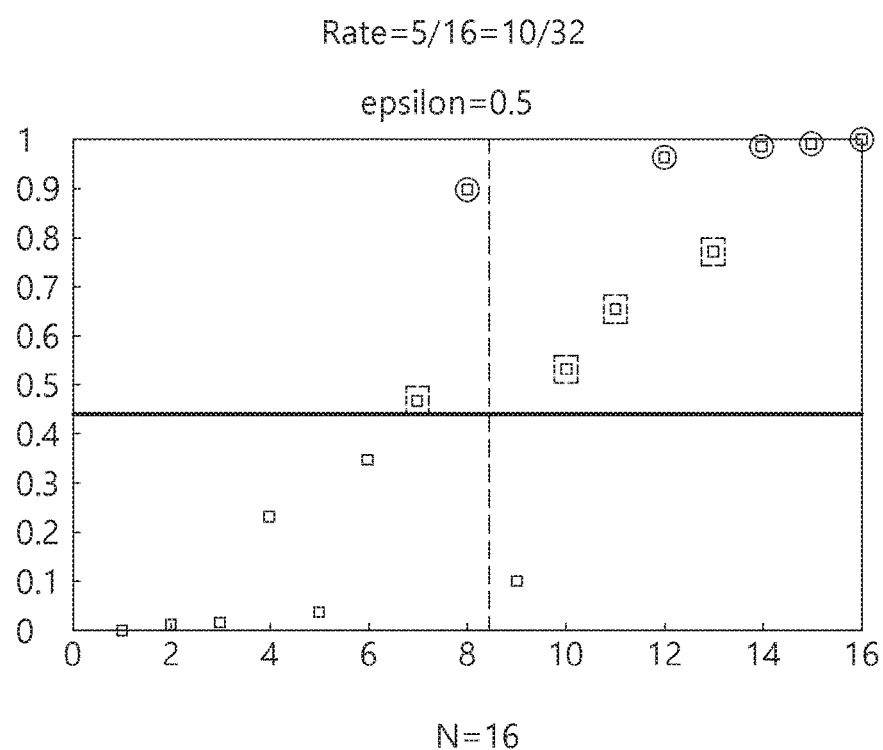
Figure 13C:
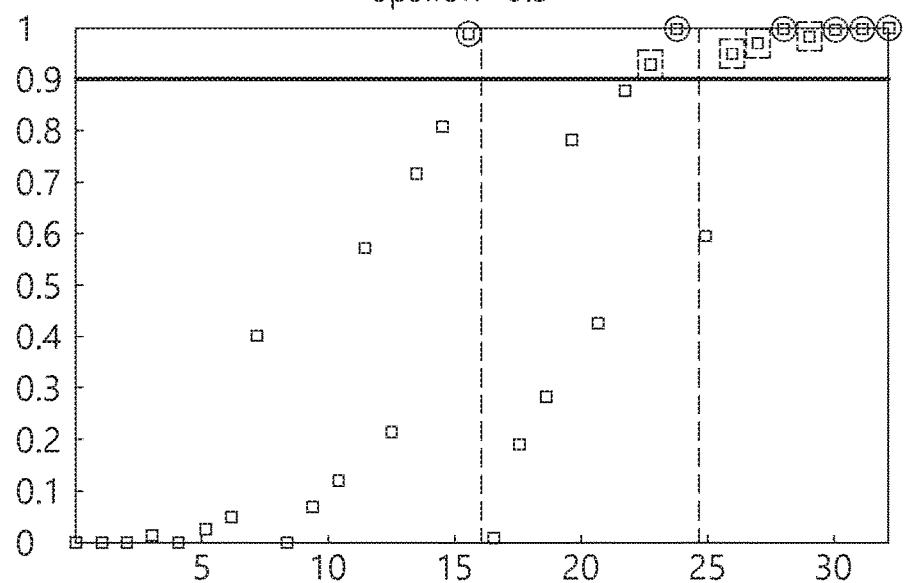

Since the formation of the mother code is completed, as shown in FIG. 14C and FIG. 13C, the packet is divided for the HARQ transmission. Referring to FIG. 13A and FIG. 14A, the code having the length of 8 represents the first packet. This packet corresponds to a polar code that selects and transmits only the 8 bit channels located on the rightmost part of the mother code. The code shown in FIG. 13B and FIG. 14B represents a code, which is configured of a combination of the first packet and the second packet, and which has a combined length of 16. The basic HARQ transmission method is identical to the above-described HARQ method 2. As shown in FIG. 13 and FIG. 14, in case of the first packet, and in case of combining the first packet and the second packet, the information bits being transmitted to the legitimate receiver cannot be decoded by the eavesdropper (i.e., the information bits are only transmitted through bit channels having mutual information less than the standard value) but can be successfully decoded by the legitimate receiver (i.e., the information bits are only transmitted through bit channels having mutual information equal to the standard value or more). In conclusion, when using HARQ based on the secure polar coding, which is proposed in this specification, reliability and security in communication may both be achieved.

2. Secure Polar Coding for Multiple Users 2.1 Basic Concept

Figure 15:
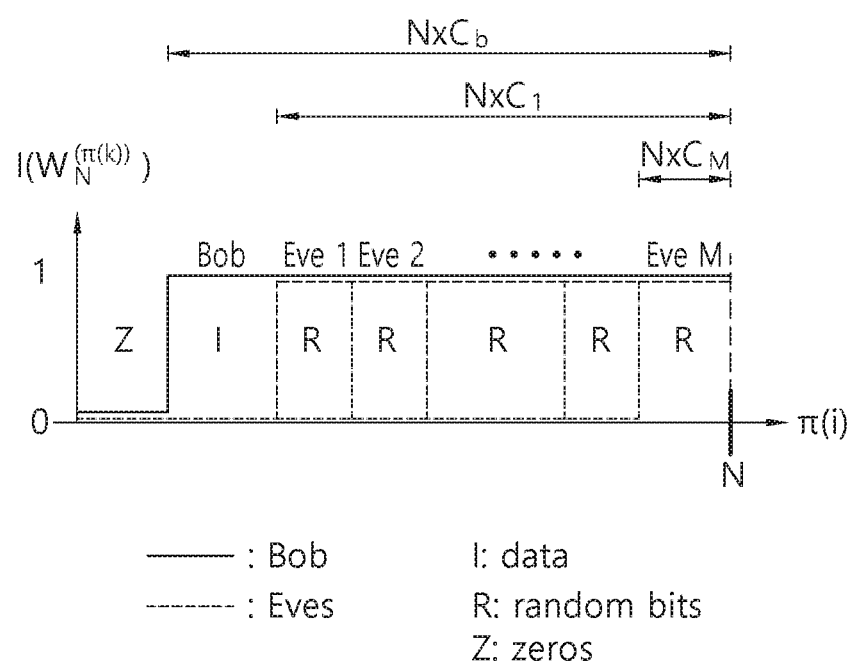
FIG. 15 shows an example of a legacy secure polar coding method, when M number of eavesdroppers exist.

FIG. 15 shows an example of a legacy secure polar coding method, when M number of eavesdroppers exist.

As described above, secure polar coding may be used as one of the most effective methods of physical layer security. However, the legacy secure polar coding was designed under the assumption that the number of eavesdroppers (or Eves) is equal to 1, as shown in FIG. 3. If the concept of the legacy secure polar coding is extended to a plurality of users, a secure polar coding method may be designed, as shown in FIG. 15. In FIG. 15, a case when M number of eavesdroppers exist is assumed. Herein, (wherein j=1, 2, . . . , M) represents a channel capacity of a $j^{th}$ eavesdropper. In this case, the secure channel capacity $C_s$ is given as shown below.

$$C_s = C_b - \max_{j=1,2,\ldots M} C_j \qquad \text{[Equation 2]}$$

The meaning of the equation indicates that, among all of the eavesdroppers, the eavesdropper having the best channel condition becomes the representative eavesdropper, and that the actual secure channel capacity corresponds to a difference between the channel capacity of the legitimate receiver and the channel capacity of the eavesdropper. Eventually, information bits corresponding to the secure channel capacity may be transmitted. A problem that may occur in this case is that, as the number of eavesdroppers increases, the channel capacity $$\max_{j=1,2,\ldots,M} C_j$$

of a representative eavesdropper (or main eavesdropper) becomes closer to the channel capacity of the legitimate receiver. And, as a result, the secure channel capacity value becomes very low. In conclusion, if the legacy secure polar coding method is used in a case wherein a plurality of eavesdroppers exist, without any modification, the performance may not be satisfactory.

2.2 A Case When Two Eavesdroppers Exist

Figure 16:
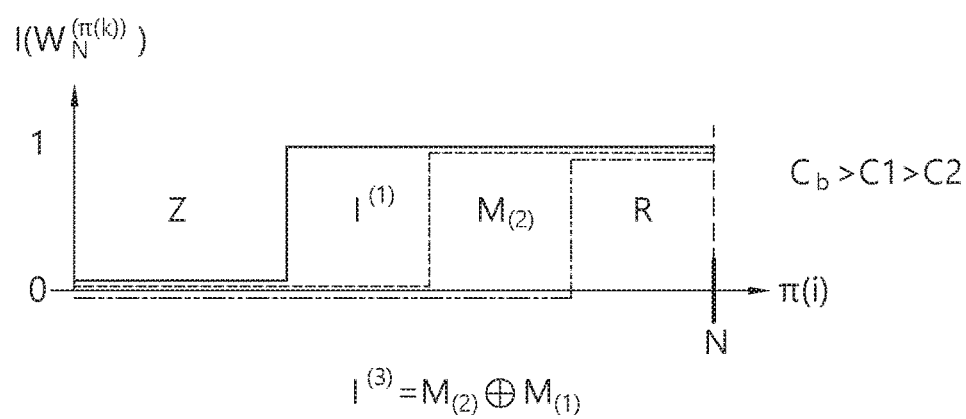
FIG. 16 shows an example of the proposed secure polar coding method, when two eavesdroppers exist.
Figure 16:
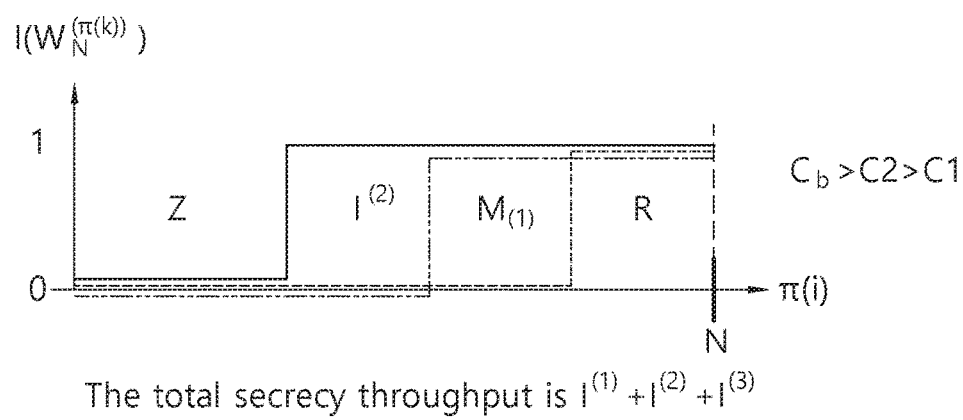

FIG. 16 shows an example of the proposed secure polar coding method, when two eavesdroppers exist.

In this section, the proposed secure polar coding method corresponding to a case wherein two eavesdroppers exist will hereinafter be described. FIG. 16 represents the proposed method. Firstly, under the assumption that the channel of the legitimate receiver has the best channel condition, two possibilities exist for the channels of the two eavesdroppers: $C_b > C_1 > C_2$ or $C_b > C_2 > C_1$.

In case of the first possibility $C_b > C_1 > C_2$, data are transmitted as shown in an upper part of FIG. 16, and, in case of the second possibility $C_b > C_2 > C_1$, data are transmitted as shown in a lower part of FIG. 16. In FIG. 16, the two types of data $M_{\{1\}}$ and $M_{\{2\}}$ satisfy the following condition.

$$I^{(3)} = M_{\{2\}} \oplus M_{\{1\}} \qquad \text{[Equation 3]}$$

More specifically, when $M_{\{1\}}$ and $M_{\{2\}}$ are processed with XOR coding, data $I^{(3)}$ are given. In this specification, this type of coding is referred to as XOR coding or one-time pad coding. Each of the two above-described cases will hereinafter be described in detail.

In case of $C_b > C_1 > C_2$ (shown in the upper part of FIG. 16), the legitimate receiver may decode all of the three types of data $I^{(1)}$, $M_{\{2\}}$, and R. A first eavesdropper may decode $M_{\{2\}}$ and R, and a second eavesdropper may decode R. Herein, the $M_{\{3\}}$ indicates XOR-coded data that cannot be decoded by the second eavesdropper.

In case of $C_b > C_2 > C_1$ (shown in the lower part of FIG. 16), the legitimate receiver may decode all of the three types of data and $I^{(2)}$, $M_{\{1\}}$, and R. The second eavesdropper may decode $M_{\{1\}}$ and R, and the first eavesdropper may decode R. Herein, the $M_{\{1\}}$ indicates XOR-coded data that cannot be decoded by the first eavesdropper.

Eventually, after experiencing both possible channel situations ($C_b > C_1 > C_2$ and $C_b > C_2 > C_1$), the legitimate receiver may be capable of decoding all types of data $I^{(2)}$, $I^{(2)}$, $M_{\{1\}}$, $M_{\{2\}}$, and R. Herein, with the exception for the meaningless random data R, since $I^{(3)}$ may be decoded by using the equation $I^{(3)} = M_{\{2\}} \oplus M_{\{1\}}$, the total size of secure data that can be decoded by the legitimate receiver may be given as $I^{(1)} + I^{(2)} + I^{(3)}$.

Consideration will now be made on which type of data can be decoded by the eavesdropper. Since the first eavesdropper is capable of decoding $M_{\{2\}}$ but incapable of decoding $M_{\{1\}}$, the first eavesdropper cannot decode $I^{(3)}$. For the same reason, the second eavesdropper cannot decode $I^{(3)}$. In other words, both of the two eavesdroppers are incapable of decoding any of the data.

2.3 A Case When Two or More Eavesdroppers Exist

Figure 17:
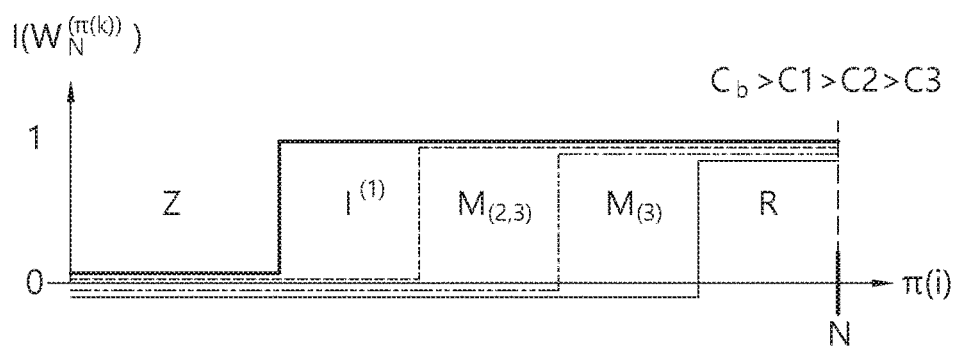
FIG. 17 shows an example of the proposed secure polar coding method in a situation using two specific channels, when three eavesdroppers exist.
Figure 17:
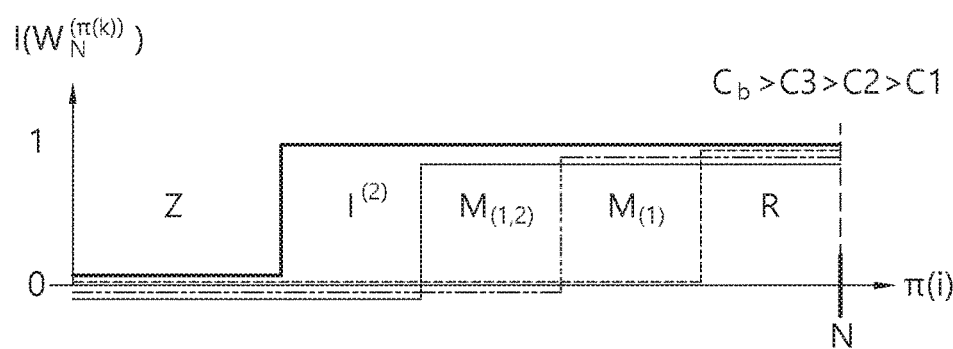

FIG. 17 shows an example of the proposed secure polar coding method in a situation using two specific channels, when three eavesdroppers exist. And, FIG. 18 shows an example of the proposed secure polar coding method in a situation using all available channels, when three eavesdroppers exist.

FIG. 17 and FIG. 18 illustrate the secure polar coding method, which is proposed in this specification, corresponding to a case wherein three eavesdroppers exist. FIG. 17 illustrates the proposed method according to two possible channel situations, which are shown below. As shown in FIG. 17, $M_{\{2,3\}}$, $M_{\{1\}}$, $M_{\{3\}}$, and $M_{\{1,2\}}$ are configured so as to establish the relationship shown below in Equation 4.

$$I^{(3)} = M_{\{2,3\}} \oplus M_{\{1\}}$$

$$I^{(4)} = M_{\{3\}} \oplus M_{\{1,2\}} \qquad \text{[Equation 4]}$$

After experiencing the two channel situations $C_b > C_1 > C_2 > C_3$ and $C_b > C_3 > C_2 > C_1$, a total secrecy throughput obtained by the legitimate receiver is given as $I^{(1)} + I^{(2)} + I^{(3)} + I^{(4)}$.

Figure 18A:
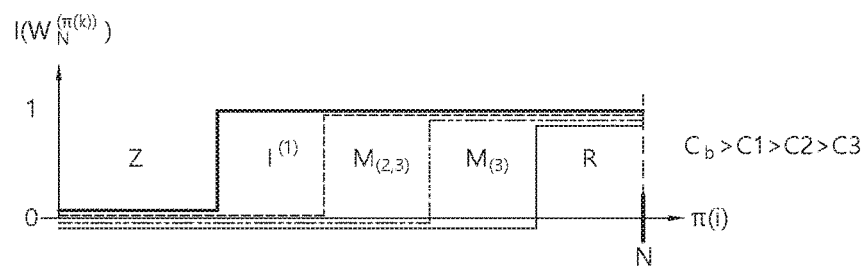
FIG. 18A and FIG. 18B show an example of the proposed secure polar coding method in a situation using all available channels, when three eavesdroppers exist.
Figure 18A:
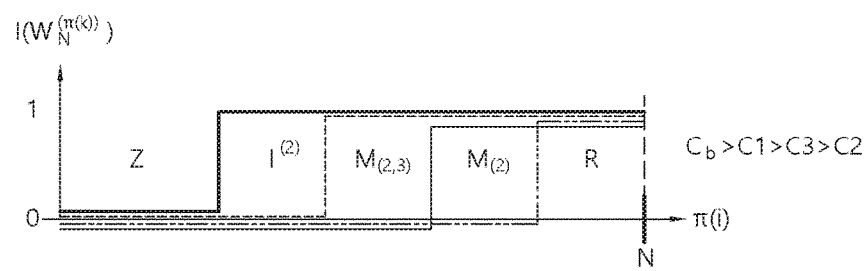
Figure 18A:
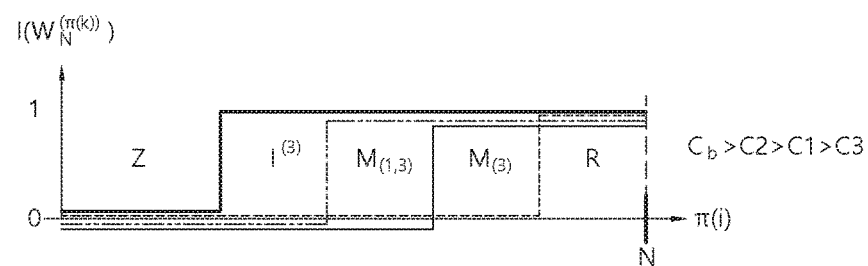
Figure 18B:
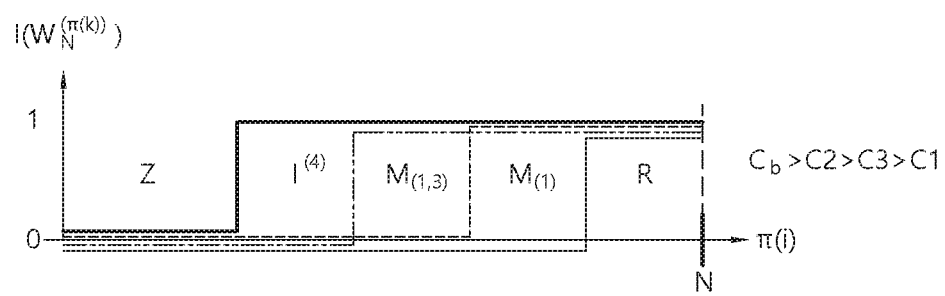
Figure 18B:
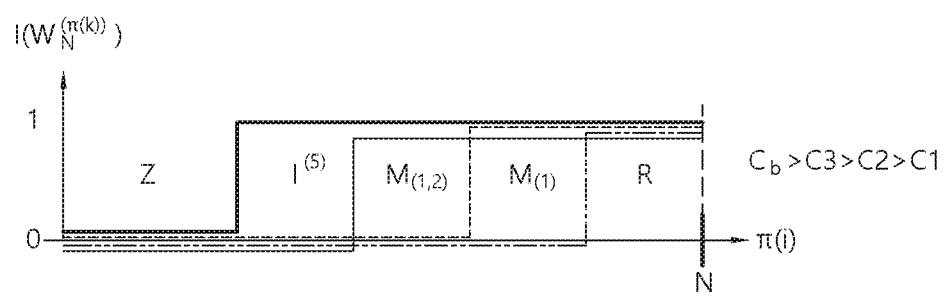
Figure 18B:
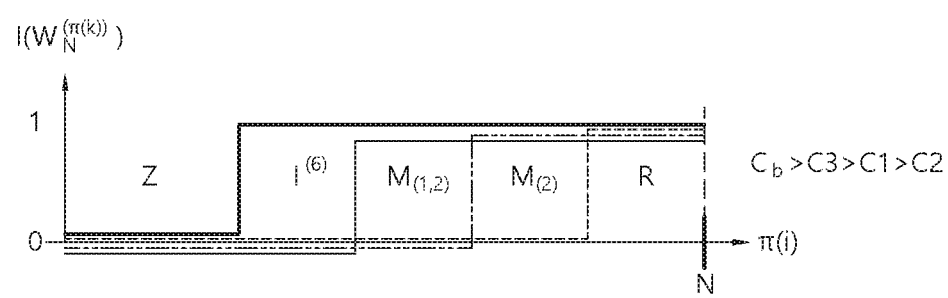

When 2 eavesdroppers exist, 2 different types of channel situations exist under the assumption that the channel of the legitimate receiver has the best channel condition. However, in case 3 eavesdroppers exist, 6 different types of channel conditions exist. All of the above-described channel situations and the corresponding polar coding method are shown in FIG. 18 (FIG. 18A and FIG. 18B).

Figure 19:
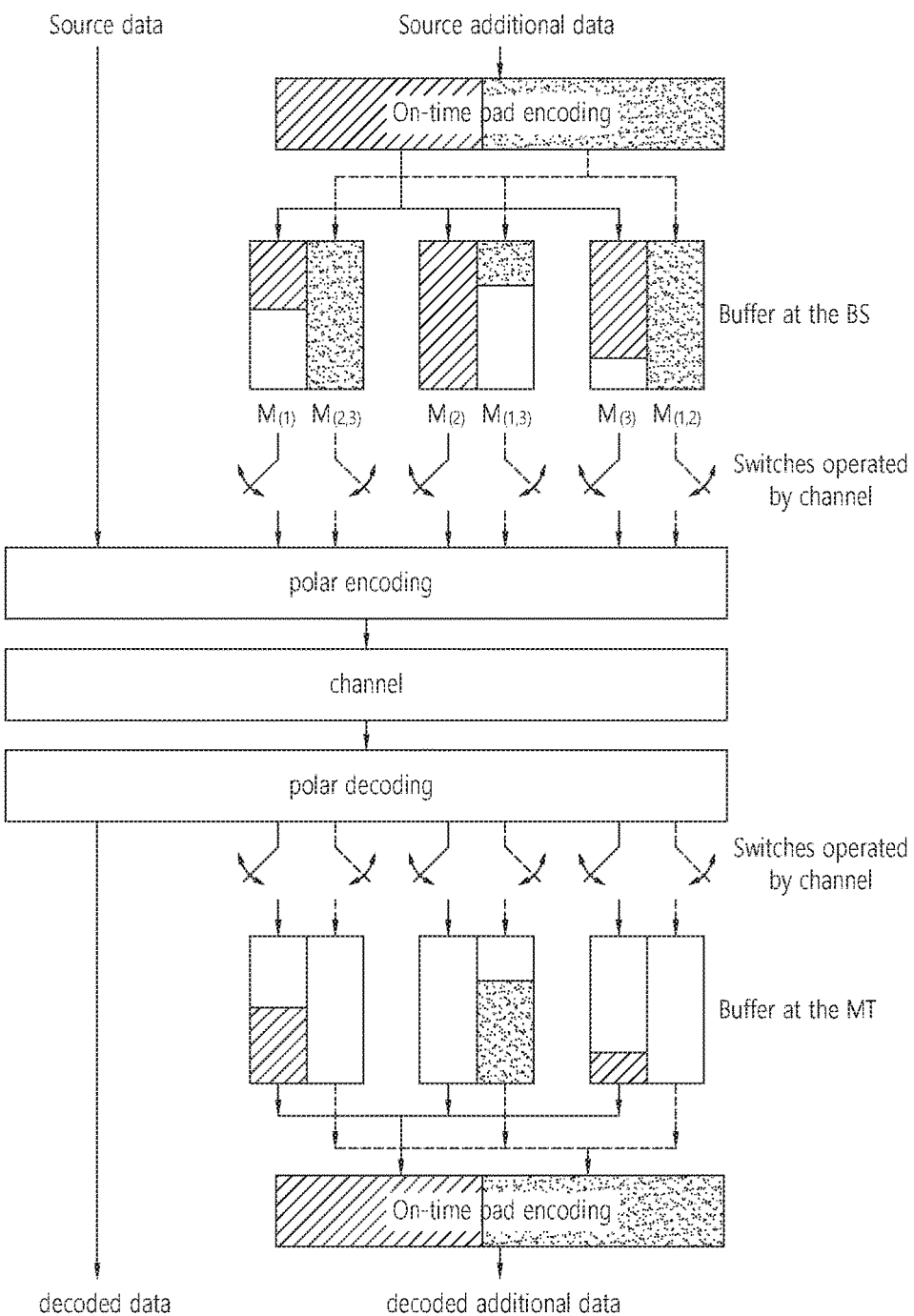
FIG. 19 shows an example of embodying the proposed secure polar coding, when three eavesdroppers exist.

FIG. 19 shows an example of implementing the proposed secure polar coding, when three eavesdroppers exist.

FIG. 19 illustrates a method of actually performing the method proposed in this specification. Firstly, the transmission data are divided into two different types. Referring to FIG. 19, a part that is indicated as source data corresponds to data that are not XOR-coded and only coded with secure polar codes and then transmitted (e.g., this part corresponds to $I^{(1)}$ and $I^{(2)}$ shown in FIG. 17). Another type of input data corresponds to a part that is indicated as source additional data. This type of data corresponds to data that being transmitted by using XOR coding. As shown in FIG. 19, the input data are modified to two different types of data through a one-time pad encoding process and then stored in a buffer. For example, by performing one-time pad encoding on data $I^{(1)}$, $M_{\{1\}}$ and $M_{\{2,3\}}$ are generated and then respectively stored in two buffers. In case 3 eavesdroppers exist, under the assumption that the channel of the legitimate receiver has the best channel condition, since a total of 6 different channel situations exist, and since one buffer exists for each of the 6 different channel situations, a total of 6 buffers exist. The 6 buffers are then grouped by 2 (i.e., paired), thereby forming 3 pairs of buffers. Subsequently, a switch is operated in accordance with the channel situation, and, then, the corresponding data are stored in the corresponding buffer. When data are received by both buffers of each buffer pair, XOR operation is performed, thereby recovering the data.

Figure 20:
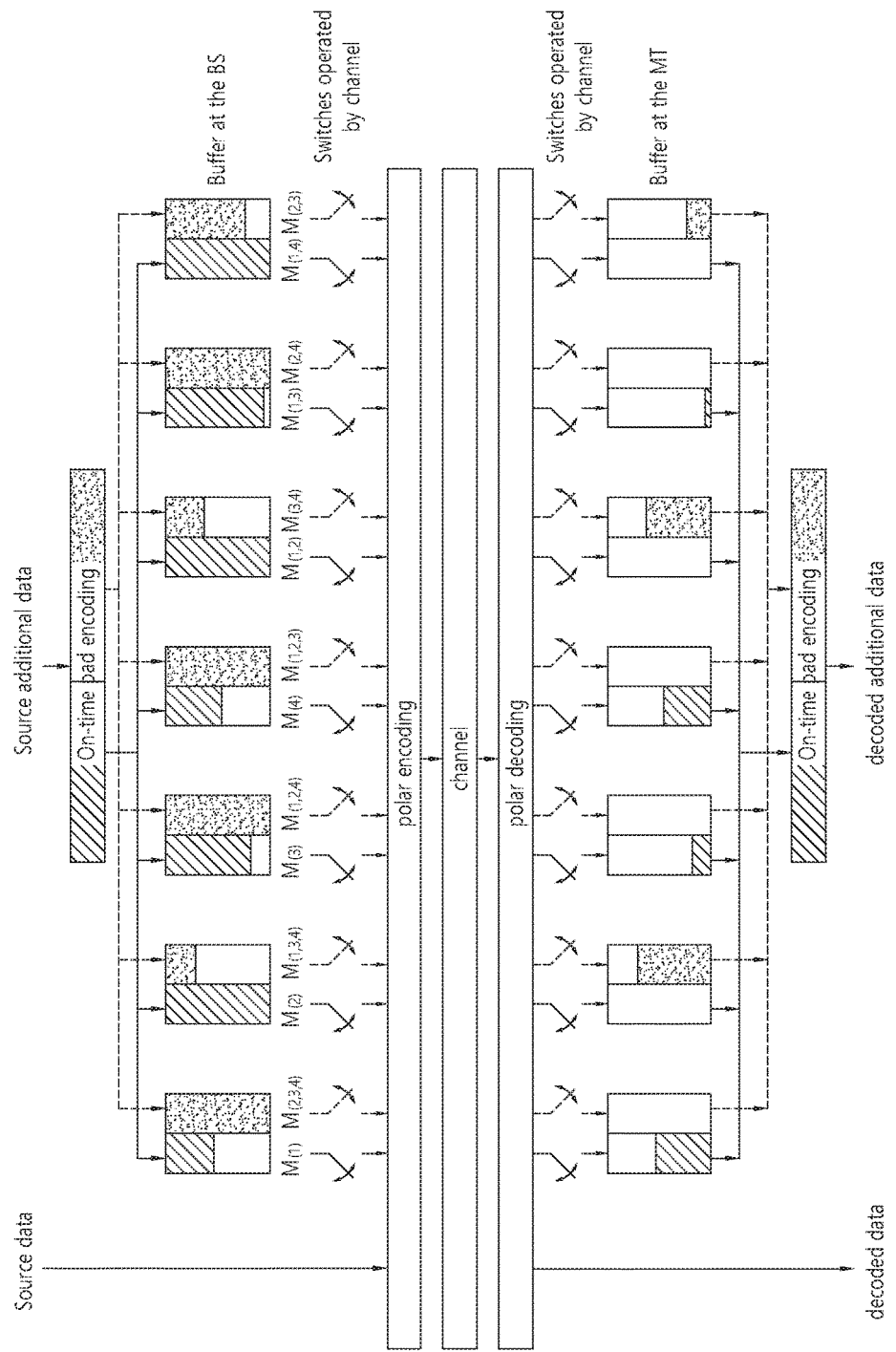
FIG. 20 shows an example of embodying the proposed secure polar coding, when four eavesdroppers exist.

FIG. 20 shows an example of implementing the proposed secure polar coding, when four eavesdroppers exist.

FIG. 20 illustrates a method of performing secure polar coding, which is proposed in this specification, corresponding to a case wherein four eavesdroppers exist. By using this method, the secure polar coding method corresponding to a case wherein an arbitrary M number of eavesdroppers exist may also be performed.

2.4 Transmitting Data to a User Not Having the Best Channel Condition

If data are transmitted by using the secure polar coding method, which is proposed in the description presented above, the data transmission capacity may always be more enhanced as compared to the legacy secure polar coding method. However, the above-described method only considers the case of transmitting data to a user having the best channel condition. If the target to which the transmitting ends intends to transmit data is a user not having the best channel condition, the transmitting end is required to wait (or be on-stand-by) until the corresponding user acquires a good channel. In this case, a considerable length of delay may occur. Alternatively, there may occur a case when the user wishing to receive data fails to acquire the best channel condition at all. In this case, it will be impossible to transmit data by using the legacy secure polar coding method. In order to resolve such problems, a method for transmitting data to users not having the best channel condition will be proposed as described below.

Figure 21:
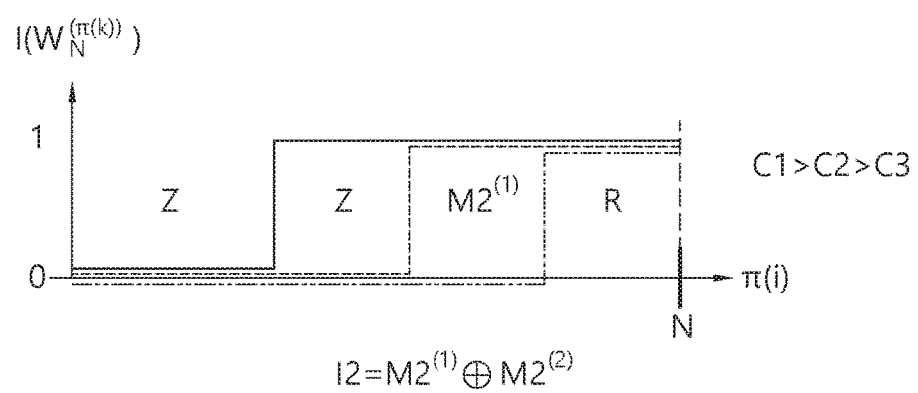
FIG. 21 shows an example of the proposed secure polar coding method, when transmitting data to a user not being in the best channel state.
Figure 21:
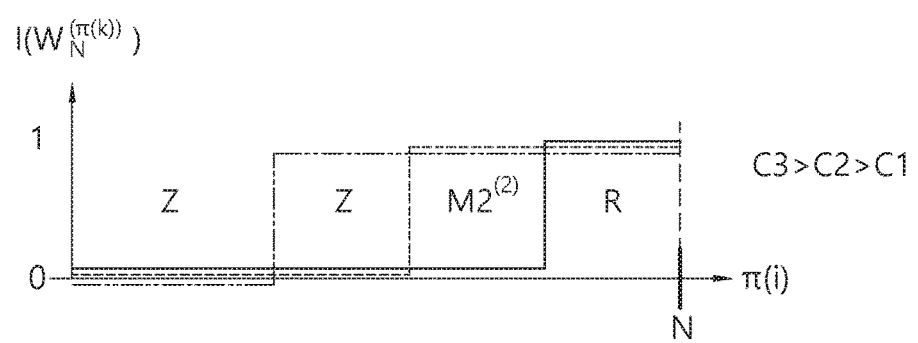

FIG. 21 shows an example of the proposed secure polar coding method, when transmitting data to a user not being in the best channel state.

FIG. 21 illustrates the proposed method. In this example, 3 users exist, and the channel capacity of each user is indicated as $C_j$, j=1,2,3. In this case, it will be assumed that the transmitting end wishes to transmit data to a second user. Herein, the channels of the first user and the third user do not undergo many changes in their channel situations because they have frequently experienced fading, and that, since the channel of the second user has hardly changed. And, therefore, it will also be assumed that two different types of channel situations exist: $C_1 > C_2 > C_3$ and $C_3 > C_2 > C_1$.

Since both channel conditions do not correspond to cases where the second user has the best channel condition, data cannot be transmitted to the second user by using the legacy polar coding method. However, of the transmission method is configured as shown in FIG. 21, data may be transmitted to the second user.

$M2^{(1)}$ that is indicated on an upper part of FIG. 21 may be decoded by the first user and the second user but cannot be decoded by the third user. $M2^{(2)}$ that is indicated on a lower part of FIG. 21 may be decoded by the third user and the second user but cannot be decoded by the first user. In other words, the only user who can decode both $M2^{(1)}$ and $M2^{(1)}$ is the second user. Therefore, data may be transmitted by using $I2 = M2^{(1)} \oplus M2^{(2)}$ so that only the second user can decode the corresponding data.

Figure 22:
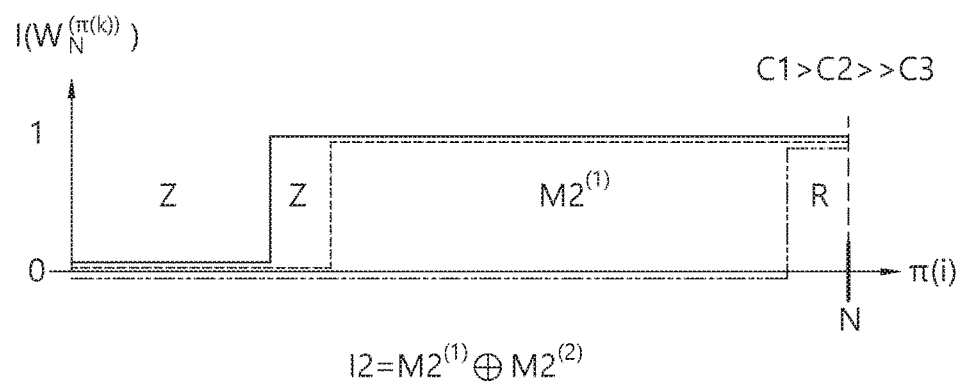
FIG. 22 shows an example of the proposed secure polar coding method maximizing a secure transmission rate.
Figure 22:
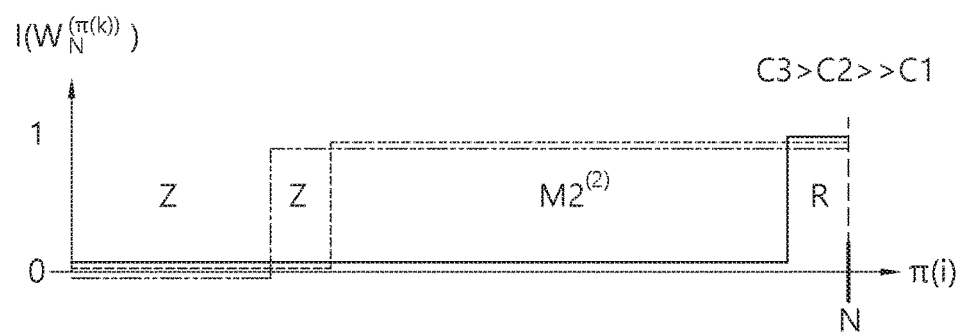

FIG. 22 shows an example of the proposed secure polar coding method maximizing a secure transmission rate.

Another reason for transmitting data to users who do not have the best channel condition is to achieve maximum throughput. This example is shown in FIG. 22. In FIG. 22, the following two different types of channel situations exist: $C_1 > C_2 \gg C_3$ 와 $C_3 > C_2 \gg C_1$ In this case, two different transmission methods may be considered as described below. Firstly, in case of $C_1 > C_2 \gg C_3$, data may be transmitted only to User 1 by using the legacy secure polar coding, and, in case of $C_3 > C_2 \gg C_1$, data may be transmitted only to User 2 by using the legacy secure polar coding. A second possible method is to transmit data by using the method shown in FIG. 22. In other words, $M2^{(1)}$ and $M2^{(2)}$ are transmitted to the second user, and the second user decodes I2 by using $I2 = M2^{(1)} \oplus M2^{(2)}$.

When comparing the total throughput of the two methods, due to $C_2 \gg C_3$ and $C_2 > C_1$, it is apparent that the secure transmission rate is higher in the case of performing transmission by using the method shown in FIG. 22 as compared to the case of performing transmission by using the first method (i.e., the method of transmitting data only to users having the best channel condition). The essential reason for this is because the secure transmission rate increases not in proportion to the channel capacity of the user who wishes to receive data, but in proportion to a difference between a channel capacity of a user who wishes to receive data and a channel capacity of a user having a next best (or second best) channel condition. In other words, depending upon how a channel capacity value is assigned to each of a plurality of users, the total secrecy data throughput may be maximized by transmitting data to users who do not have the best channel condition.

Although the example of FIG. 22 shows a case when data is transmitted to a user having the second best channel condition, in a case where a larger number of users exist, the total secrecy data throughput may be maximized when data are transmitted to a user other than the user having the second best channel condition (e.g., a user having a third best channel condition). In this case, the data may be transmitted to a specific user by whom the total secrecy data throughput can be maximized.

An overall description of the method for performing HARQ by using a polar code having an arbitrary length may be described as presented below.

A transmitter generates a mother bit sequence having a size of M that is to be transmitted to a receiver. The mother bit sequence includes information bits that are to be transmitted to the receiver and frozen bits that are pre-defined between the transmitter and the receiver.

The transmitter punctures a mother code and acquires a first input bit sequence having an arbitrary length of M. The transmitter calculates mutual information based on a likelihood distribution of a Log Likelihood Ratio (LLR) for the mother bit sequence and may then puncture the mother bit sequence so as to reduce any loss in the calculated mutual information. At this point, the likelihood distribution of the LLR may be calculated by using the Gaussian approximation. In this case, a ratio between the information bits being included in the first input bit sequence and the frozen bits (i.e., the transmission rate) may be configured by an indication signal, which was received in advance, or may be configured in advance.

The transmitter determines the positions of the information bits and the frozen bits so that the channel capacity for the information bits and the frozen bits and/or the distribution of the mutual information can be maximized.

Also, the transmitter generates a first output bit sequence by processing the first input bit sequence through a first encoder and transmits the generated first output sequence to the receiver. When a re-transmission request (e.g., NACK) is received from a legitimate receiver, the transmitter acquires a second input bit sequence from the mother bit sequence and then acquires a third input bit sequence that does not require re-transmission from the acquired second input bit sequence. The transmitter generates a second output bit sequence by processing the third input bit sequence through a second encoder and transmits the generated second output bit sequence to the receiver.

Additionally, in order to resolve the problems of the legacy secure polar coding, a HARQ combination method combining HARQ method 1 and HARQ method 2 may be described as presented below.

The transmitter transmits a first packet to the receiver. The transmitter receives a re-transmission request of the first packet from the receiver. The transmitter transmits a second packet to the receiver. At this point, the receiver may only receive the second packet or may receive a combined packet of the first packet and the second packet and may then perform decoding of the received packet. Herein, the second packet may correspond to a packet including the first packet.

At this point, the first packet includes at least one information bit and at least one frozen bit, and the second packet includes at least one information bit and at least one frozen bit. The at least one information bit may correspond to a bit having a mutual information size corresponding to a bit channel that is greater than or equal to a pre-defined threshold value, and the at least one frozen bit may correspond to a bit having a mutual information size corresponding to a bit channel that is less than the pre-defined threshold value.

An information bit having the smallest mutual information for a bit channel included in the first packet is re-transmitted through a first bit channel, which can transmit at least one information bit included in the second packet. More specifically, among the bit channels that are added by using the second packet, a specific bit channel is used for performing repetition (REP) coding, thereby being capable of re-transmitting information bits, which were transmitted to a bit channel having the smallest mutual information within the first packet.

Alternatively, new information bits may be transmitted through a second bit channel, which can transmit at least one information bit included in the second packet. More specifically, among the bit channels that are added by using the second packet, new information bits may be transmitted by using a bit channel having the best channel condition.

The HARQ combination method corresponds to an operation combining the two above-described method, wherein a number of new information bits (=a number of second bit channels) and a number of REP-coded information bits (=a number of first bit channels) that are to be transmitted through the bit channels being added by the second packet may be determined.

The number of first bit channels and the number of second bit channels may be determined so that the throughput of the second packet can have a maximum value. At this point, the throughput of the second packet may be determined based on a code rate of the second packet and a frame decoding error and a channel Signal to Noise Ratio (SNR) of the second packet.

The code rate of the second packet corresponding to the case where the number of first bit channels is greater than the number of second bit channels may be smaller than the code rate of the second packet corresponding to the case where the number of first bit channels is smaller than the number of second bit channels.

However, the frame decoding error of the second packet corresponding to the case where the number of first bit channels is greater than the number of second bit channels may be smaller than the frame decoding error of the second packet corresponding to the case where the number of first bit channels is smaller than the number of second bit channels.

More specifically, when a larger number of REP-coded information bits than new information bits are transmitted through bit channels that are added by the second packet, since the frame decoding error of the second packet is low, this is advantageous in light of error likelihood. However, since the code rate of the second packet also becomes low, this is disadvantageous in light of the transmission rate. Accordingly, the number of first bit channels and the number of second bit channels may be determined so that the throughput of the second packet can have a maximum value.

Additionally, polar coding may be applied to information bits that are being transmitted through the first bit channels and the second bit channels.

As another example of the HARQ combination method, the transmitter may transmit additional information bits along with the second packet to the receiver. At least one information bit being included in the first packet may be re-transmitted through a third bit channel, which may transmit the additional information bits. At this point, polar coding is not applied (or polar codes are not applied) to the additional information bits.

In order to allow the receiver to perform REP decoding and polar decoding at the same time, the receiver is required to perform list decoding, which requires a number of branches proportional to an ascending power of the number of decoded bits. However, list decoding is disadvantageous in that it increases decoding complexity. Therefore, by having the transmitter transmit additional information bits that are REP-coded but not polar coded, the receiver may measure the LLR values of the additional information bits and may immediately perform decoding without having to perform list decoding. Thus, the problem of decoding complexity does not occur.

Figure 23:
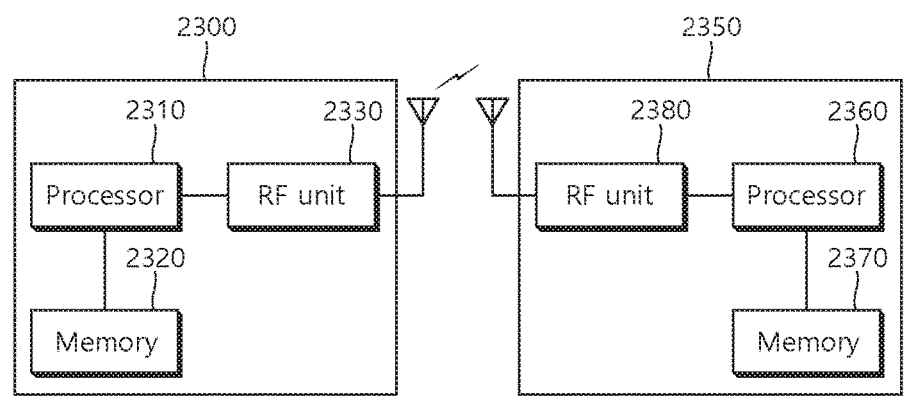
FIG. 23 is a block view illustrating a wireless device to which the exemplary embodiment of the present invention can be implemented.

FIG. 23 is a block view illustrating a wireless device to which the exemplary embodiment of the present invention can be implemented.

A transmitter 2300 includes a processor 2310, a memory 2320, and a transmission/reception unit (or RF unit) 2330. A memory 2320 is connected to a processor 2310 and saves various information for operating the processor 2310. The transmission/reception unit (or RF unit) 2330 is connected to the processor 2310 and transmits and/or receives a wireless signal. The processor 2310 implements the suggested function, process, and/or method. In the above described embodiments, the operation of the transmitter may be implemented by the processor 2310.

A receiver 2350 includes a processor 2360, a memory 2370, and a transmission/reception unit (or RF unit) 2380. The memory 2370 is connected to the processor 2360 and saves various information for operating the processor 2360. The transmission/reception unit (or RF unit) 2380 is connected to the processor 2360 and transmits and/or receives a wireless signal. The processor 2360 implements the suggested function, process, and/or method.

The processor may include an application-specific integrated circuit (ASIC), another chip set, a logical circuit and a data processing device. The memory may include a read-only memory (ROM), a random access memory (RAM), a flash memory, a memory card, a storage medium, and/or another storage device. The RF unit may include a baseband circuit for processing the radio signal. When the exemplary embodiment is implemented as software, the above-described method may be implemented as a module (process, function, and so on) performing the above-described functions. The module may be stored in the memory and may be executed by the processor. The memory may be located inside or outside of the processor and may be connected to the processor through a diversity of well-known means.

As described above, the method and device for performing a Hybrid Automatic Repeat request (HARQ) based on polar codes have the following advantages. According to the method proposed in this specification, the communication performance may be more enhanced than the already-existing polar coding HARQ. More specifically, when the same transmission delay occurs, the frame error rate (FER) may decrease, or when the same FER is given, the transmission delay may be decreased.

Additionally, this specification proposes a polar coding HARQ method that can be applied to physical layer security communication. Finally, this specification proposes a polar coding method for physical layer security corresponding to a case when multiple eavesdroppers exist. By using this method, security in communication may be efficiently provided without having to carry out the complicated process of generating, distributing, and managing security keys as in the conventional cryptography based methods. Most particularly, the performance of the secure polar coding method may be more enhanced than the conventionally proposed method.

In the above-described exemplary system, although the methods are described based on a flow chart that is configured of a series of steps or blocks, the present invention will not be limited only to the order of such steps. And, therefore, some steps may occur in a different order or at the same time as another step that is described above. Furthermore, it will be apparent to anyone skilled in the art that the steps mentioned in the flow chart are not exclusive, and that any other step may be further included or any or more steps may be deleted without influencing the scope and spirit of the present invention.

What is claimed is:

1. A method for performing a Hybrid Automatic Repeat request (HARQ) based on polar codes, comprising:
   transmitting, by a transmitter, a first packet to a receiver;
   receiving, by the transmitter, a re-transmission request for the first packet from the receiver; and
   transmitting, by the transmitter, a second packet to the receiver,
   wherein the first packet includes at least one information bit and at least one frozen bit,
   wherein the second packet includes at least one information bit and at least one frozen bit, and
   wherein an information bit having a smallest mutual information corresponding to a bit channel within the first packet is re-transmitted through a first bit channel capable of transmitting at least one information bit included in the second packet, or
   wherein a new information bit is transmitted through a second bit channel capable of transmitting at least one information bit included in the second packet.

2. The method of claim 1, wherein the at least one information bit corresponds to a bit having a mutual information corresponding to a bit channel greater than or equal to a pre-defined threshold value, and
   wherein the at least one frozen bit corresponds to a bit having a mutual information corresponding to a bit channel less than a pre-defined threshold value.

3. The method of claim 1, wherein a code rate of the second packet corresponding to a case where a number of first bit channels is greater than a number of second bit channels is lower than a code rate of the second packet corresponding to a case where a number first bit channels is less than a number of second bit channels.

4. The method of claim 3, wherein a frame decoding error of the second packet corresponding to a case where a number of first bit channels is greater than a number of second bit channels is smaller than a frame decoding error of the second packet corresponding to a case where a number first bit channels is less than a number of second bit channels.

5. The method of claim 4, wherein the number of first bit channels and the number of second bit channels are determined so as to allow a throughput of the second packet to have a maximum value, and
   wherein the throughput of the second packet is determined based on a code rate of the second packet and a frame decoding error and a channel Signal to Noise Ratio (SNR) of the second packet.

6. The method of claim 1, wherein polar codes are applied to information bits being transmitted through the first bit channels and the second bit channels.

7. The method of claim 6, further comprising:
   transmitting, by the transmitter, additional information bits along with the second packet to the receiver,
   wherein at least one information bit included in the first packet is re-transmitted through a third bit channel capable of transmitting the additional information bits, and
   wherein polar codes are not applied to the additional information bits.

8. A device for performing a Hybrid Automatic Repeat request (HARQ) based on polar codes, comprising:
   a radio frequency (RF) unit transmitting and receiving radio signals; and
   a processor being operatively connected to the RF unit,
   wherein the processor is configured:
   to transmit a first packet to a receiver,
   to receive a re-transmission request for the first packet from the receiver, and
   to transmit a second packet to the receiver,
   wherein the first packet includes at least one information bit and at least one frozen bit,
   wherein the second packet includes at least one information bit and at least one frozen bit, and
   wherein an information bit having a smallest mutual information corresponding to a bit channel within the first packet is re-transmitted through a first bit channel capable of transmitting at least one information bit included in the second packet, or
   wherein a new information bit is transmitted through a second bit channel capable of transmitting at least one information bit included in the second packet.

9. The device of claim 8, wherein the at least one information bit corresponds to a bit having a mutual information corresponding to a bit channel greater than or equal to a pre-defined threshold value, and
   wherein the at least one frozen bit corresponds to a bit having a mutual information corresponding to a bit channel less than a pre-defined threshold value.

10. The device of claim 8, wherein a code rate of the second packet corresponding to a case where a number of first bit channels is greater than a number of second bit channels is lower than a code rate of the second packet corresponding to a case where a number first bit channels is less than a number of second bit channels.

11. The device of claim 10, wherein a frame decoding error of the second packet corresponding to a case where a number of first bit channels is greater than a number of second bit channels is smaller than a frame decoding error of the second packet corresponding to a case where a number first bit channels is less than a number of second bit channels.

12. The device of claim 11, wherein the number of first bit channels and the number of second bit channels are determined so as to allow a throughput of the second packet to have a maximum value, and wherein the throughput of the second packet is determined based on a code rate of the second packet and a frame decoding error and a channel Signal to Noise Ratio (SNR) of the second packet.

13. The device of claim 8, wherein polar codes are applied to information bits being transmitted through the first bit channels and the second bit channels.

14. The device of claim 13, wherein the processor is configured to transmit additional information bits along with the second packet to the receiver, wherein at least one information bit included in the first packet is re-transmitted through a third bit channel capable of transmitting the additional information bits, and wherein polar codes are not applied to the additional information bits.

* * * * *